United States Patent
Ge et al.

(10) Patent No.: US 8,423,499 B2
(45) Date of Patent: Apr. 16, 2013

(54) SEARCH DEVICE AND SEARCH METHOD

(75) Inventors: Yi Ge, Kawasaki (JP); Shinichiro Tago, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 0 days.

(21) Appl. No.: 12/974,877

(22) Filed: Dec. 21, 2010

(65) Prior Publication Data

US 2011/0093429 A1 Apr. 21, 2011

Related U.S. Application Data

(63) Continuation of application No. PCT/JP2008/061913, filed on Jul. 1, 2008.

(51) Int. Cl.
*G06F 17/00* (2006.01)
*G06F 15/00* (2006.01)
*G06N 7/04* (2006.01)
*G06N 99/00* (2010.01)
*G06E 1/00* (2006.01)
*G06E 3/00* (2006.01)
*G06G 7/00* (2006.01)

(52) U.S. Cl.
USPC .............................................. 706/54; 706/10

(58) Field of Classification Search ........................ None
See application file for complete search history.

(56) References Cited

U.S. PATENT DOCUMENTS

| | | | | |
|---|---|---|---|---|
| 4,550,436 A | * | 10/1985 | Freeman et al. | 382/218 |
| 4,876,643 A | * | 10/1989 | McNeill et al. | 710/110 |
| 5,452,451 A | * | 9/1995 | Akizawa et al. | 1/1 |
| 6,931,401 B2 | * | 8/2005 | Gibson et al. | 1/1 |
| 7,590,620 B1 | * | 9/2009 | Pike et al. | 1/1 |
| 8,010,481 B2 | * | 8/2011 | Sherwood et al. | 706/62 |
| 8,051,022 B2 | * | 11/2011 | Pandya | 706/45 |
| 2005/0165765 A1 | * | 7/2005 | Neruse et al. | 707/3 |
| 2008/0271141 A1 | * | 10/2008 | Goldman et al. | 726/22 |
| 2010/0138634 A1 | * | 6/2010 | Noyes | 712/30 |
| 2010/0174770 A1 | * | 7/2010 | Pandya | 709/200 |
| 2011/0320393 A1 | * | 12/2011 | Pandya | 706/45 |

FOREIGN PATENT DOCUMENTS

| | | |
|---|---|---|
| JP | 4-111064 | 4/1992 |
| JP | 6-96124 | 4/1994 |
| JP | 2865831 | 12/1998 |
| JP | 2005-242672 | 9/2005 |
| JP | 2006-228254 | 8/2006 |
| WO | 2004/084095 A1 | 9/2004 |

OTHER PUBLICATIONS

Baezr-Yates et al.; "A New Approach to Text Searching"; 1992; Communications of the ACM, vol. 35, No. 10; pp. 74-82.*
Thompson, Ken; "Regular Expression Seach Algorithm"; 1968; Communications of the ACM, vol. 11, No. 6; pp. 419-422.*
Navarro, Gonzalo; "A Partial Deterministic Automaton for Approximate String Matching"; 1997; Proc. of Fourth South American Workshop on String Processing; 13 Pages.*
Nagakura, Hiroshi; Asls Data Searching Using Database Engine 'Shunsaku Data Manager', Fujitsu, Apr. 2006, vol. 57, No. 2, pp. 134-139.*
Hiroshi Nagakura, "Asls Data Searching Using Database Engine 'Shunsaku Data Manager'," Fujitsu, Apr. 2006, vol. 57, No. 2, pp. 134-139.
International Search Report for PCT/JP2008/061913, mailed Sep. 9, 2008.

* cited by examiner

*Primary Examiner* — Jeffrey A Gaffin
*Assistant Examiner* — Stanley K Hill
(74) *Attorney, Agent, or Firm* — Staas & Halsey LLP

(57) ABSTRACT

A search device includes an accelerator and a CPU. The accelerator includes a plurality of search cores and a scheduler. The scheduler is configured to distribute target text to the search cores in units of records ordered by record sequence number, and the search cores are configured to perform automaton matching on the distributed records in a parallel fashion. The CPU is configured to construct an automaton in accordance with a search expression input thereto, and to perform logical expression evaluations in order of the record sequence number on matching results obtained on a record-by-record basis.

19 Claims, 32 Drawing Sheets

[DOCUMENT]

・・・black・・・

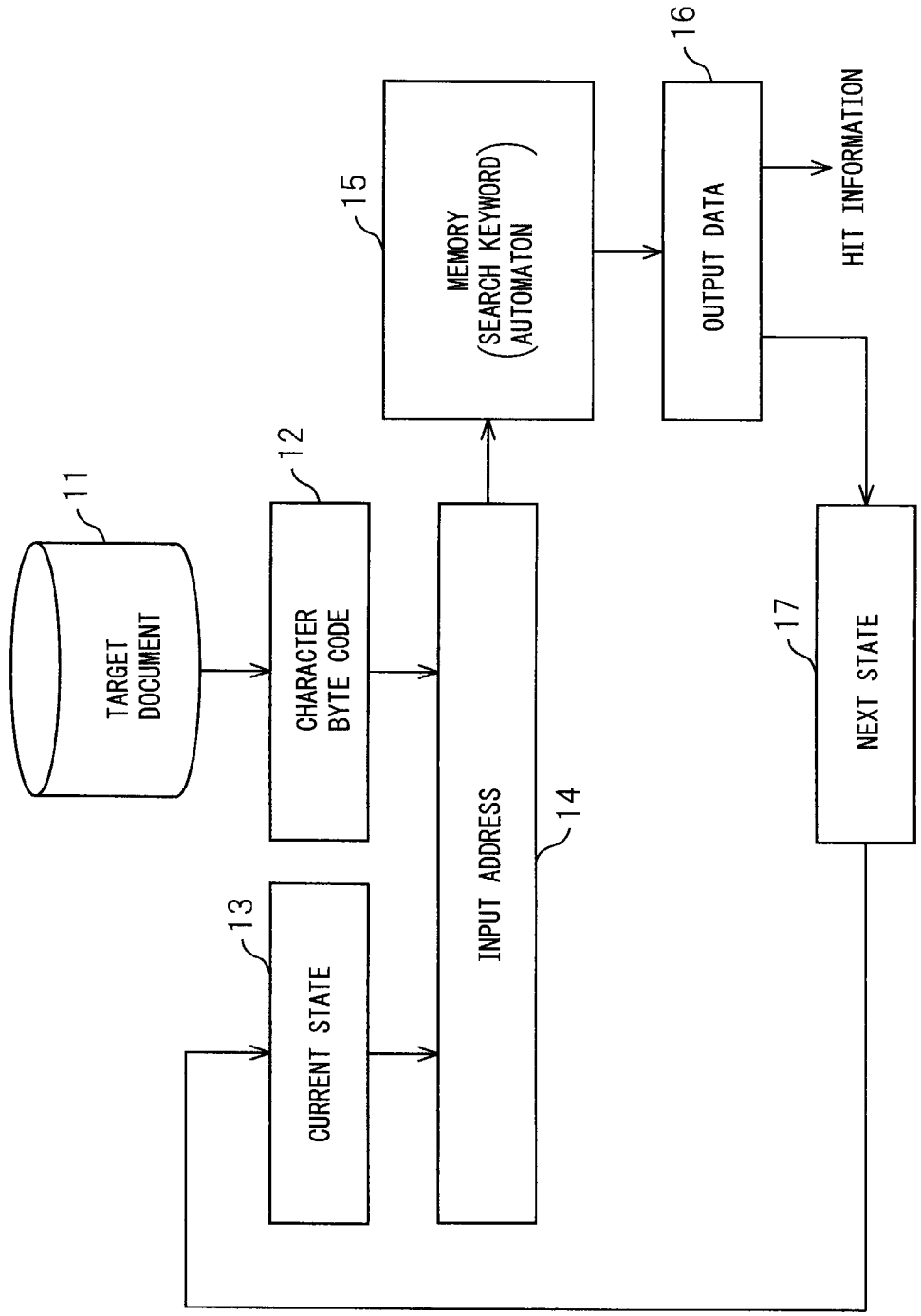

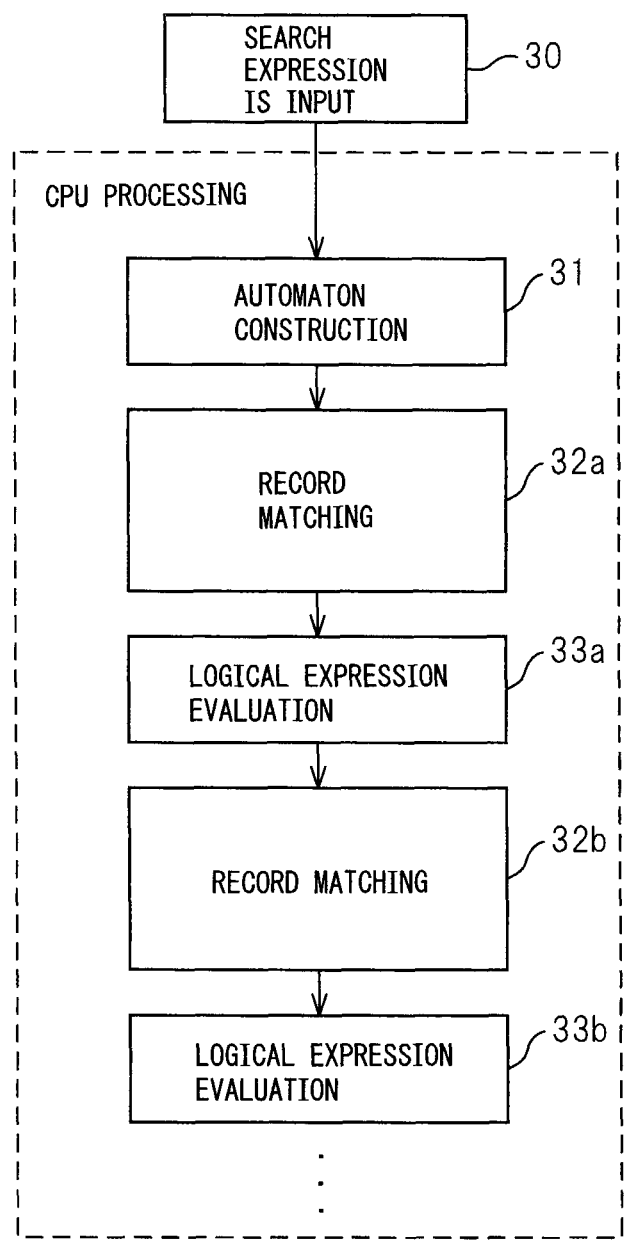

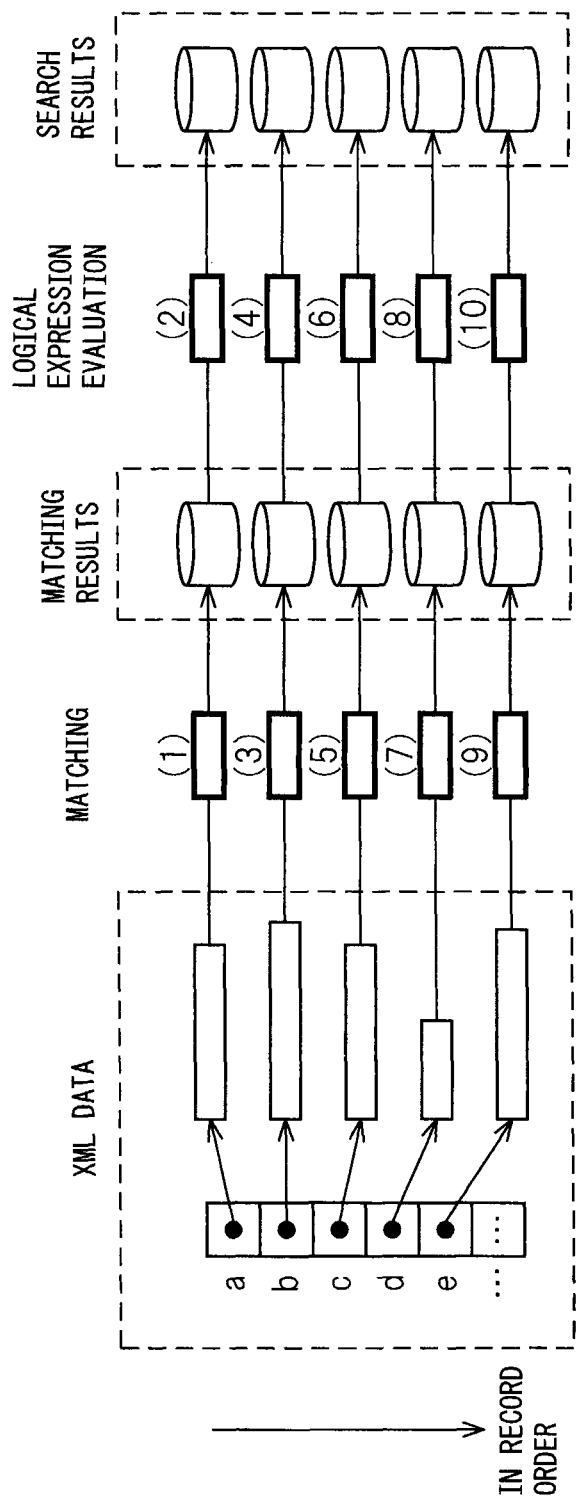

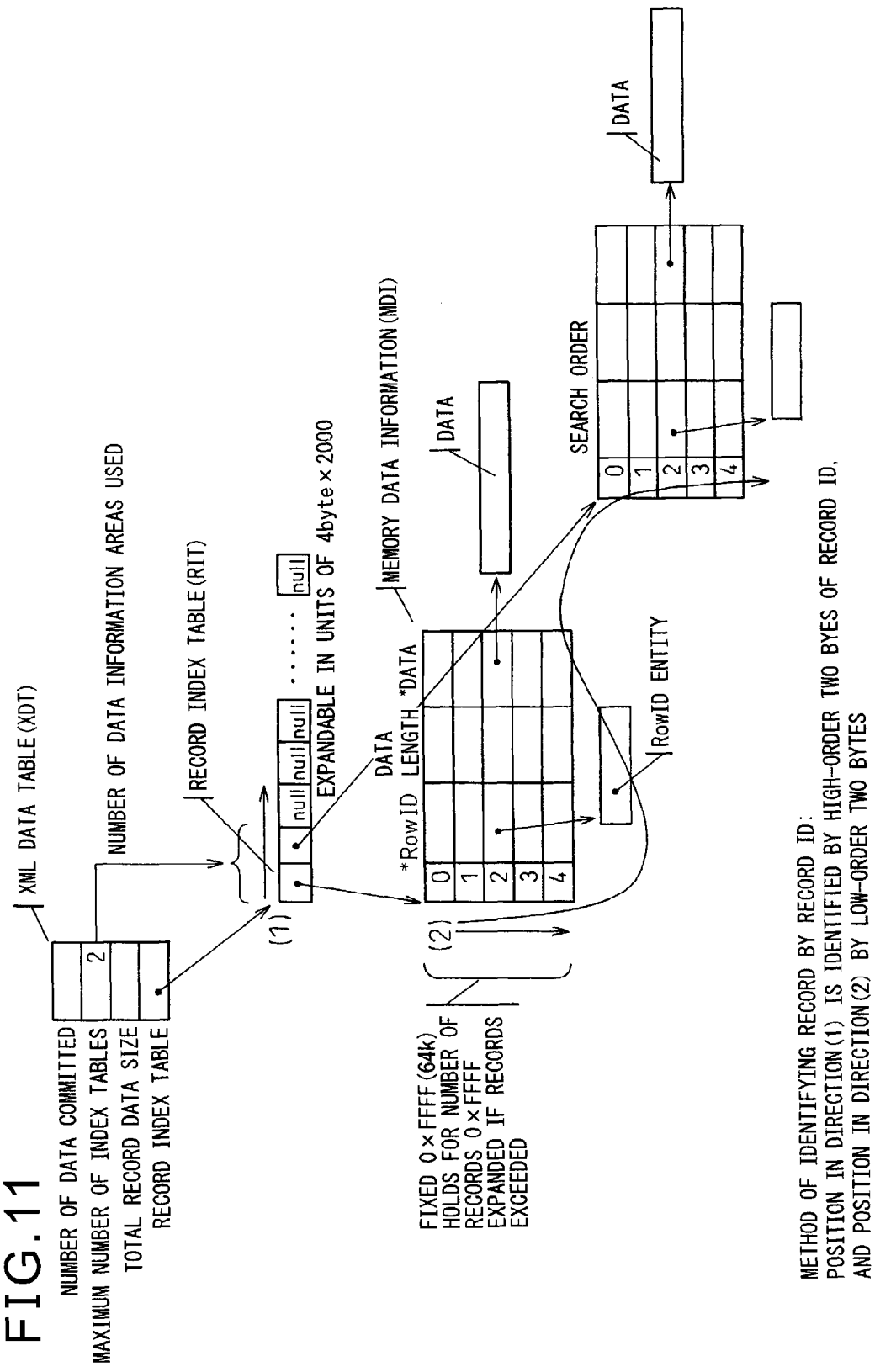

FIG.12

| MAJOR CLASSIFICATION | MODULES | | ROLE |
|---|---|---|---|
| | MIDDLE CLASSIFICATION | MINOR CLASSIFICATION | |
| SOFTWARE | APPLICATION | SIGMA EVALUATION (SigmaEvaluation) | PERFORMS LOGICAL EXPRESSION EVALUATION. CALLS SIGMA BUFFER FULL WHEN BUFFER FULL STATE IS DETECTED. |
| SOFTWARE | DRIVER | SIGMA SEARCH (SigmaSearch) | SCANS XML INDEX, EXTRACTS POINTERS TO RECORDS IN RECORD ORDER, AND REGISTERS THEM INTO SORT ARRAY. INVOKE LOGICAL EXPRESSION EVALUATION FUNCTION BY CHECKING BUFFER STATE AT APPROPRIATE TIMING (POLLING). WHEN LOGICAL EXPRESSION EVALUATION FUNCTION IS COMPLETED, ENTRIES REGISTERED IN SORT ARRAY UP TO THAT POINT ARE FLUSHED. ADDS RECORD INFORMATION TO SORT ARRAY AT APPROPRIATE TIMING (FOR EXAMPLE, WHEN LOGICAL EXPRESSION EVALUATION FUNCTION IS COMPLETED, NUMBER OF RECORDS SO FAR EVALUATED IS COUNTED, AND THRESHOLD VALUE IS PROVIDED TO START UP). |
| SOFTWARE | DRIVER | SIGMA BUFFER FULL (SigmaBufferFull) | CALLED WHEN LOGICAL EXPRESSION EVALUATION HAS REACHED END OF EVENT BUFFER. FLUSHES EVENT BUFFER AND WAITS UNTIL MATCHING OF RECORD CURRENTLY UNDER LOGICAL EXPRESSION EVALUATION ENDS OR UNTIL THE NEXT EVENT BUFFER BECOMES FULL, WHEREUPON SIGMA BUFFER FULL IS TERMINATED. |
| SOFTWARE | SCHEDULER | — | DISTRIBUTES TO IDLE SEARCH CORE THE STARTING RECORD INFORMATION (POINTER, ETC.) REGISTERED IN SORT ARRAY FOR RECORD YET TO BE PROCESSED FOR MATCHING, AND INSTRUCTS SEARCH CORE TO START SEARCH |
| HARDWARE | SEARCH CORE | — | UPON RECEIVING RECORD INFORMATION, PERFORMS MATCHING BY READING CHARACTER STRING OF RECORD FROM MEMORY. IF HIT IS DETECTED, WRITES MATCHING RESULT TO EVENT BUFFER, WHEREUPON MATCHING ENDS. IF BUFFER RUN-OVER OR THE LIKE OCCURS, BUFFER STATE FLAG IS APPROPRIATELY CHANGED. HEN MATCHING IS COMPLETED, REPORTS IDLE STATE TO SCHEDULER AND STOPS OPERATION. IN THE EVENT OF EVENT BUFFER FULL OR THE LIKE, STALLS AND WAITS UNTIL EVENT BUFFER IS FLUSHED. |

FIG.17

| CATEGORY | ENTRY | CPU | | | | | | ACCELERATOR AC | | | |
|---|---|---|---|---|---|---|---|---|---|---|---|
| | | SIGMA BUFFER FULL | | SIGMA SEARCH | | SIGMA EVALUATION | | SCHEDULER SD | | SEARCH CORE SC | |
| | | WRITE | READ | WRITE | READ | WRITE | READ | WRITE | READ | WRITE | READ |
| RECORD SORT ARRAY | STATE FLAG | × | ○ | × | ○ | × | × | × | × | ○ | × |
| | SEARCH CORE NUMBER | × | ○ | × | × | × | × | × | × | ○ | × |
| | *RECORD | × | × | ○ | × | × | × | × | ○ | × | × |
| | VALID FLAG | × | × | ○ | ○ | × | × | × | ○ | × | × |
| | EVENT BUFFER ARRAY | × | × | ○ | × | × | ○ | × | × | × | × |
| EVENT BUFFER ARRAY | — | × | × | × | × | × | ○ | × | × | ○ | × |
| IO REGISTER | BUFFER DISTANCE (COPY) | × | ○ | × | × | × | × | × | × | ○ | × |

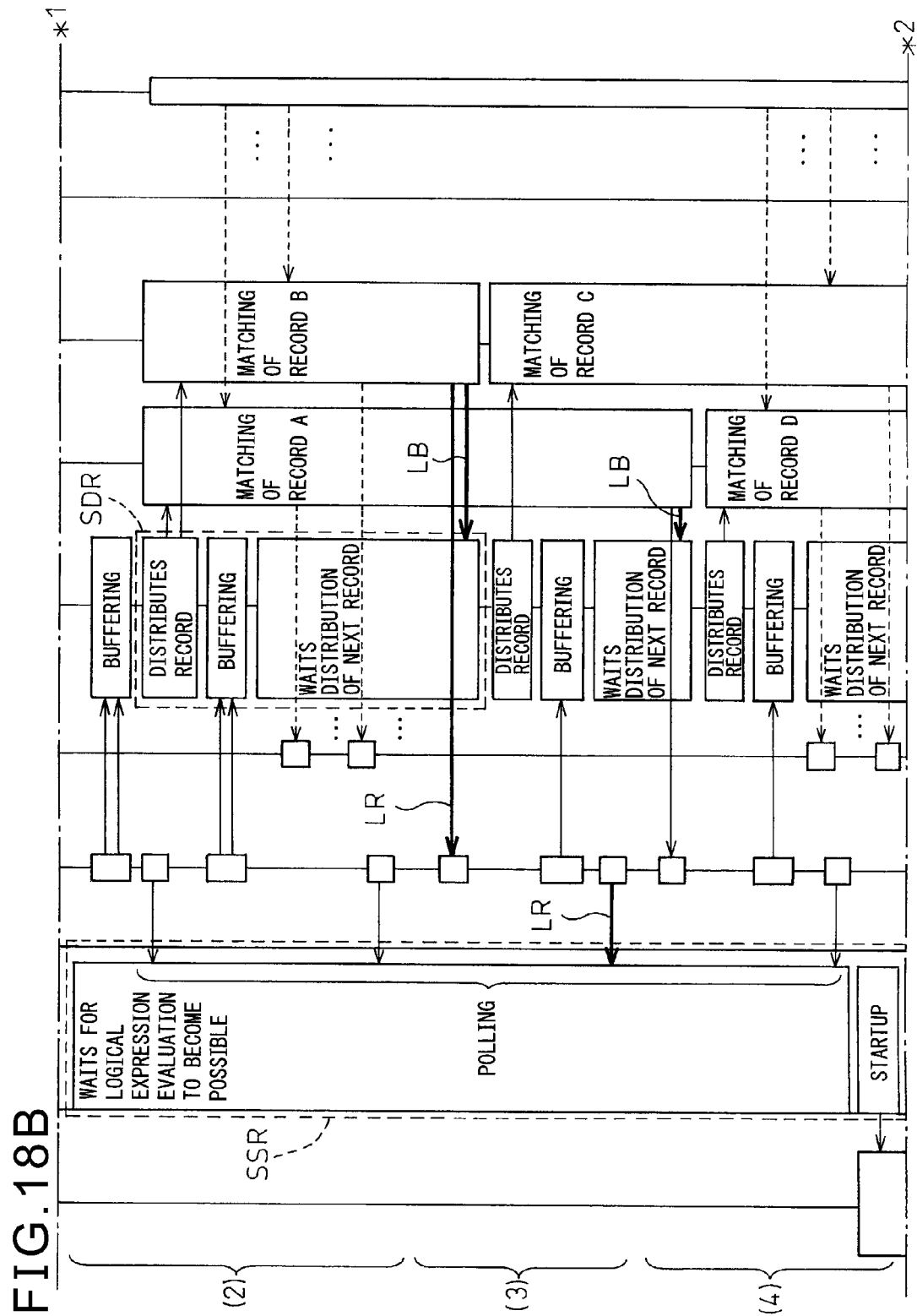

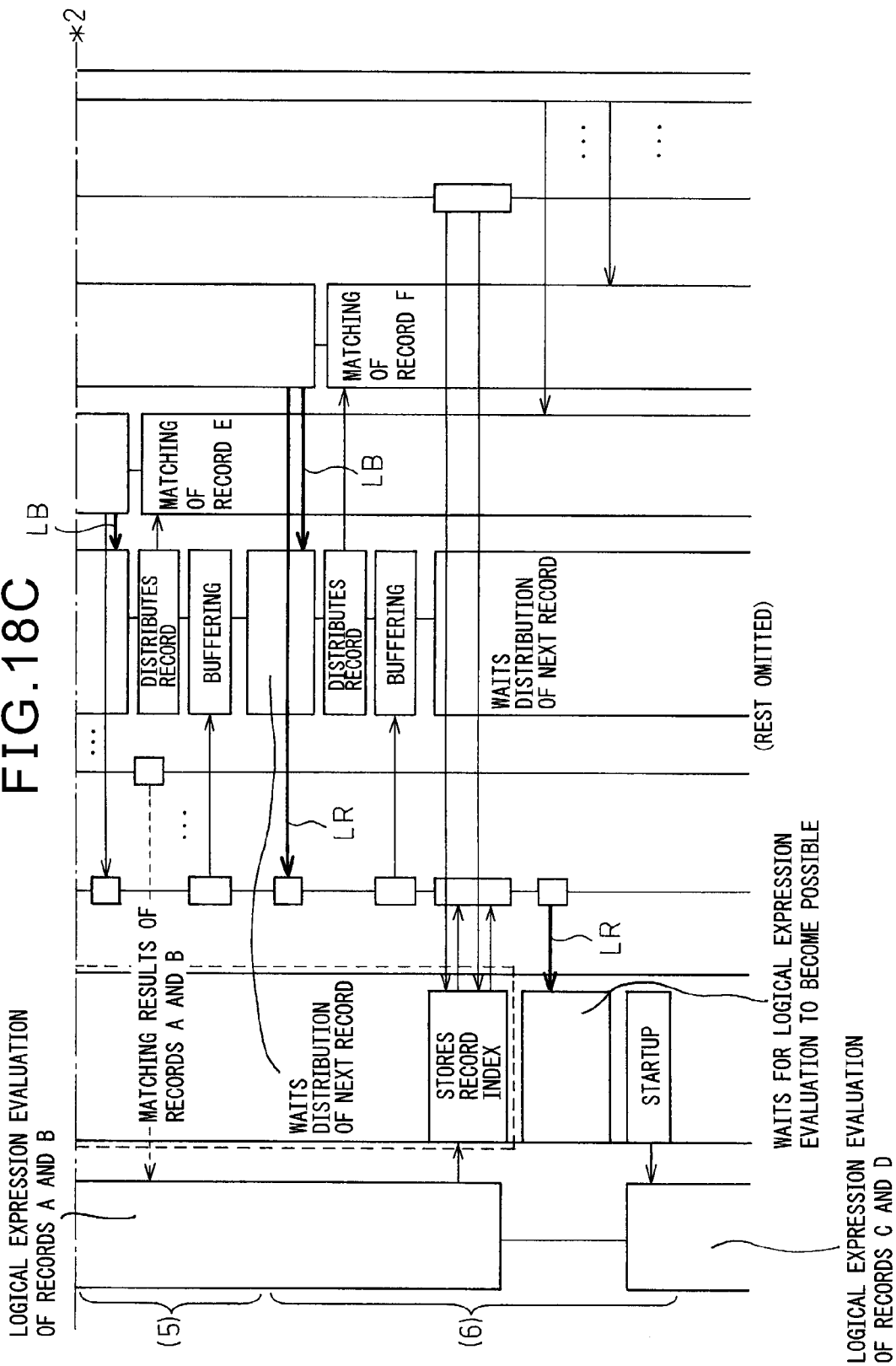

SEARCH DEVICE AND SEARCH METHOD

CROSS-REFERENCE TO RELATED APPLICATION

This application is a continuation application and is based upon PCT/JP2008/061913, filed on Jul. 1, 2008, the entire contents of which are incorporated herein by reference.

FIELD

The embodiments discussed herein are related to a search device and a search method.

BACKGROUND

Recently, the amount of information to be handled in various fields has been increasing at an explosive rate. In some fields, the amount of information has reached the order of gigabytes to terabytes, and such a huge amount of data is making it increasingly difficult to quickly retrieve desired data from a data source.

Pattern matching, a technique for searching for a particular pattern from within given text, is employed in a variety of fields including word processing software and database searches.

Specifically, the demand for applications such as XML databases that performs pattern matching (searching) for processing has been increasing in recent years and, to address this trend, there is proposed a technique in which an automaton matching device (search core) that performs pattern matching is incorporated in a processor in order to enhance the processing speed.

In the prior art, a study has been made on how fast the matching of a piece of text may be accomplished using a processor system having a plurality of matching devices.

For example, when performing matching (searching) operations in an XML database system in which the database is constructed directly from a plurality of XML text groups, if pattern matching is performed from the beginning, since there is a high degree of parallelism between each XML text the processing speed may be easily enhanced by processing the matching operations in parallel, for example, by increasing the number of matching devices. However, this increases the amount of postprocessing that the CPU performs using the results of the matching.

Further, when performing the matching process in parallel with the postprocessing by the CPU, a data transfer method and a control method for reducing the overhead involved in the parallel processing become important in order to enhance the speed of the search (matching) system as a whole.

It also becomes preferable to provide a mechanism for performing the postprocessing by the CPU while retaining the text-by-text order relationship between the matching results. For example, when performing search operations in the XML database system, if the order in which the XML text is processed by the CPU differs each time from that managed by the XML database, the search results will be presented in a different order each time, impairing the usability of the system.

There is therefore a need to provide an efficient mechanism that may process the results of the matching in parallel after the results of the matching completed in a random order through parallel processing have been made ready for postprocessing in the order of the records.

In the prior art, there is proposed a method that performs the matching of a plurality of characters at a time by using a processor system having a plurality of matching devices.

There is also proposed in the prior art a method that divides the text to be matched against in order to perform parallel processing by using a processor system having a plurality of matching devices.

Patent Document 1: Japanese Laid-open Patent Publication No. 2005-242672

Patent Document 2: Japanese Patent No. 2865831 (Japanese Laid-open Patent Publication No. H04-111064)

SUMMARY

According to an aspect of the embodiment, there is provided a search device including an accelerator and a CPU. The accelerator includes a plurality of search cores and a scheduler. The scheduler is configured to distribute target text to the search cores in units of records ordered by record sequence number, and the search cores are configured to perform automaton matching on the distributed records in a parallel fashion.

The CPU is configured to construct an automaton in accordance with a search expression input thereto, and to perform logical expression evaluations in order of the record sequence number on matching results obtained on a record-by-record basis.

The object and advantages of the embodiments will be realized and attained by means of the elements and combinations particularly pointed out in the appended claims.

It is to be understood that both the foregoing general description and the following detailed description are exemplary and explanatory and are not restrictive of the embodiments, as claimed.

BRIEF DESCRIPTION OF DRAWINGS

FIG. 2 is a diagram schematically illustrating one example of a search device;

FIG. 3 is a diagram schematically illustrating one example of a search sequence according to a prior art search device;

FIG. 4 is a diagram schematically illustrating a processing sequence according to a prior art search method;

FIG. 11 is a diagram for explaining how each record is identified based on its record ID;

FIG. 12 is a diagram for explaining the role of each module;

FIG. 16 and FIG. 17 are diagrams for explaining the relationship between data read and write operations;

FIG. 18A, FIG. 18B and FIG. 18C are diagrams for explaining the operation of a scheduler;

DESCRIPTION OF EMBODIMENTS

Before describing in detail the embodiments of a search device and a search method, the prior art and its associated problem will be described below.

Figures 1A, 1B:
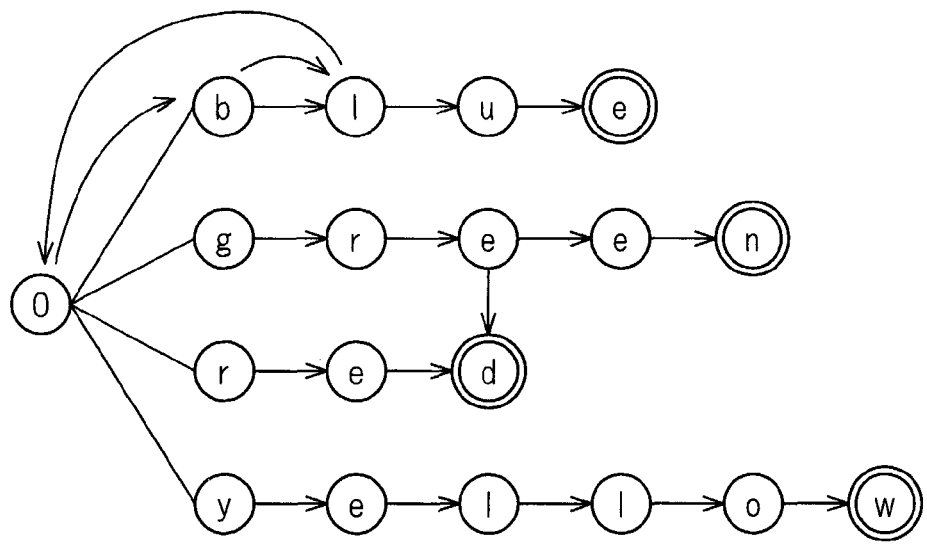
FIG. 1A and FIG. 1B are diagrams for explaining the SIGMA algorithm as one example of a keyword search algorithm using an automaton.

FIG. 1A and FIG. 1B are diagrams for explaining the SIGMA algorithm as one example of a keyword search algorithm using an automaton. FIG. 1A and FIG. 1B illustrate an example of how a search is made through a target document for keywords "blue", "green", "red", and "yellow".

First, as illustrated in FIG. 1A, an automaton corresponding to the keyword conditions is constructed. More specifically, an automaton is constructed that first makes a transition from the root indicated at "0" to the starting characters "b", "g", "r", and "y" of the respective keywords and then makes a transition to the next character in each keyword string.

If the characters of a given keyword string match up to the last character, the search for that keyword string is done. Here, the keyword string "green", for example, contains "re", and if "re" is followed by a "d", the characters match the character string "red"; therefore, there is a path that makes a transition from a position partway through the "green" to the "d" in the "red" as illustrated in FIG. 1A.

The search starts from the root, and sequentially makes a transition as it encounters a keyword in the automaton but, if a character that does not belong to any keyword is read, the search returns to the root.

For example, if a document containing "black" is input, as illustrated in FIG. 1B, a transition is made to the starting character "b" of "blue", and then a transition is made to the next "l", but since the "l" is followed by "a", the search returns to the root.

If the document contains a keyword string that matches one of the keywords in the automaton, the search proceeds to reach the last character of the keyword string and outputs "hit" information, which indicates that the keyword string is found. In the automaton search, the current position in each keyword string is indicated by a node or "state". For example, if it is at the root, it is in state 1, and if it is at the "b" in the "blue", it is in state 2; likewise, if it is at the "u", it is in state 4.

FIG. 2 is a diagram schematically illustrating one example of a search device, and more specifically, a search device using a deterministic finite-state automaton.

As illustrated in FIG. 2, when a target document 11 stored on a disk device or the like is input, character byte codes 12 are sequentially extracted from it. In the following description, it is assumed that each character byte code 12 consists of 8 bits and represents 256 entries.

An index formed from a combination of the current state (data indicating the current state) 13 held in a register and the character byte code 12 is taken as an input address 14 to a memory 15 which forms a search keyword automaton.

The memory 15 to which the input address 14 is applied produces output data 16. This output data contains the next state 17 and the hit information (hit value). Then, the next state 17 replaces the current state 13.

FIG. 3 is a diagram schematically illustrating one example of a search sequence according to a prior art search device, and FIG. 4 is a diagram schematically illustrating a processing sequence according to a prior art search method.

As illustrated in FIG. 3, in the search sequence according to the prior art search device, when a search expression is input (30), for example, an automaton is constructed (31) and, using the thus constructed automaton, the step of record matching (32a, 32b, . . . ) and the step of logical expression evaluation (33a, 33b, . . . ) are repeated in alternating fashion.

Here, the automaton construction 31, the record matching 32a, 32b, . . . , and the logical expression evaluation 33a, 33b, . . . , are all processed by a CPU (processing unit).

Further, as illustrated in FIG. 4, in the processing sequence according to the prior art search method, the record matching using the automaton, the matching result presentation, the logical expression evaluation, and the search result presentation may be performed in the order of the records.

That is, the processing sequence according to the prior art search method is such that: after the matching of a record "a" is done (1), the evaluation of the record "a" is performed (2); after the matching of a record "b" is done (3), the evaluation of the record "b" is performed (4); and then, after the matching of a record "c" is done (5), the evaluation of the record "c" is performed (6). Then, the search results may be maintained in the order of the records.

In the prior art search device and search method, the overhead associated with the parallel operation between the matching device and the CPU increases, slowing the speed of system operation, or the search results may be maintained in the order of the records.

Preferred embodiments of the search device and the search method will be described below with reference to accompanying drawings, but before that, an XML database search accelerator (AC) will be described as one example.

Search database software is ported, for example, to a dedicated server machine equipped with a high-performance processor for users who need a large-scale XML database that is difficult to handle using an IA server and, to increase the processing speed, the processor for the dedicated server is equipped with an accelerator (AC) that performs XML record matching operations.

First, the accelerator (scheduler SD and search core (matching device) SC) adapted for use in the search device (processor system) according to the present embodiments will be briefly described below. That is, an overview of the accelerator will be given along with the description of its block configuration and operation, and then the role of each module will be described.

The search device of the present embodiments is designed to search, for example, for a character string in an XML database and to retrieve from the database the data that matches the search expression entered by the user.

In the search algorithm used here, an automaton corresponding, for example, to the entered search expression is constructed, and matching operations are performed by feeding records as management units of XML data into the automaton.

The search process performed by the search device of the present embodiments is roughly divided into two processes, the record matching process and the logical expression evaluation process. The accelerator is responsible for the record matching process.

Figure 5:
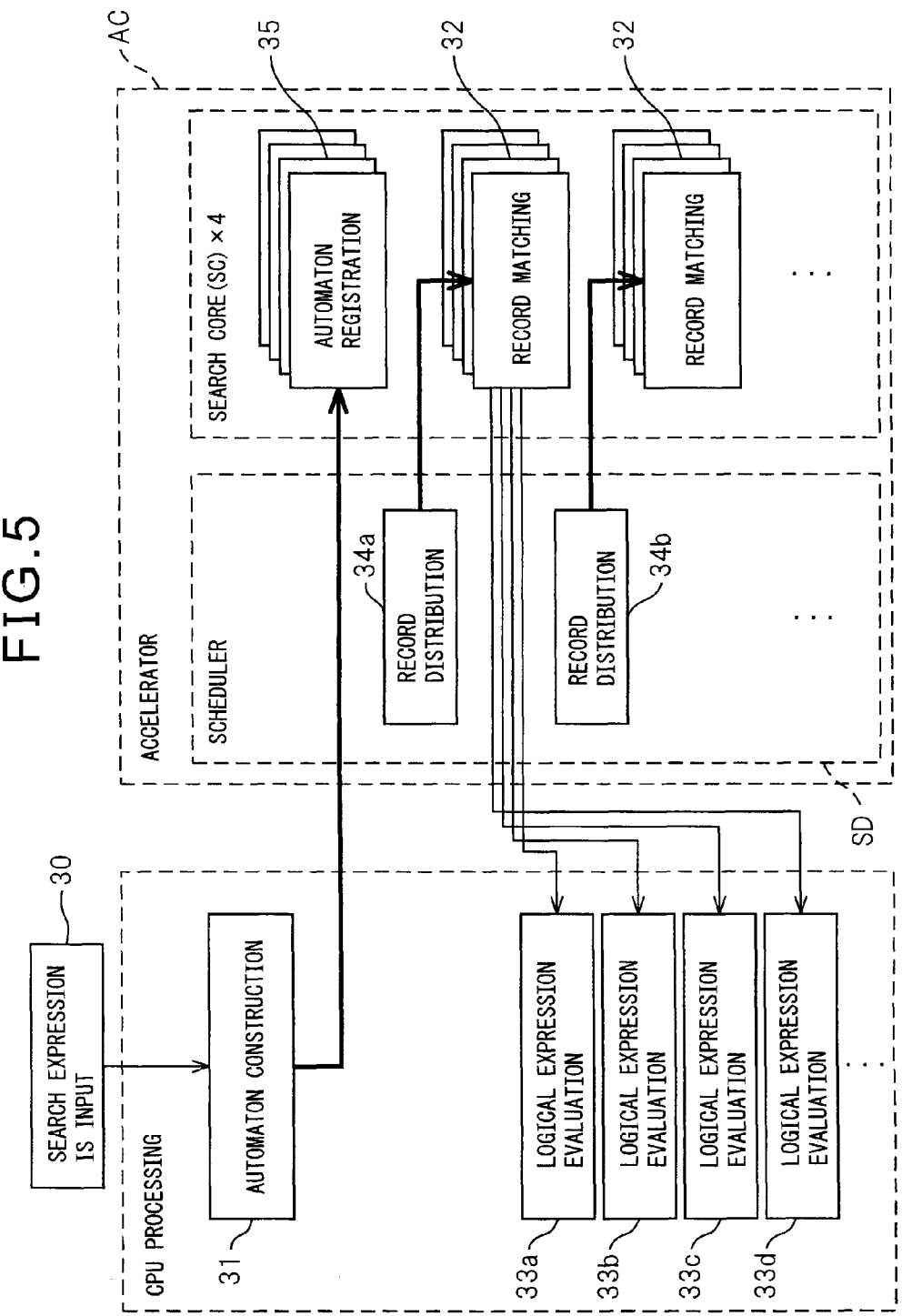
FIG. 5 is a diagram schematically illustrating one example of a search sequence according to a search device of the present embodiments.

FIG. 5 is a diagram schematically illustrating one example of the search sequence according to the search device of the present embodiments.

As will be seen from a comparison between FIG. 5 and the previously given FIG. 3, in the search sequence according to the search device of the present embodiments, the record matching operations 32a, 32b, . . . , and the logical expression evaluation operations 33a, 33b, . . . , are not all processed by the CPU, but some are processed by the accelerator AC which includes a scheduler SD and a plurality of automaton processing units (for example, four search cores) SCs.

More specifically, the scheduler SD performs record distribution operations 34a, 34b, . . . , and the search cores SCs perform automaton registration operations 35 and record matching operations 32. In this way, by mounting the scheduler SD and the plurality of search cores SCs which together constitute the accelerator AC, the record matching operations are performed in parallel thereby increasing the processing speed; furthermore, the record matching process is carried out in parallel with the logical expression evaluation process.

Figure 6:
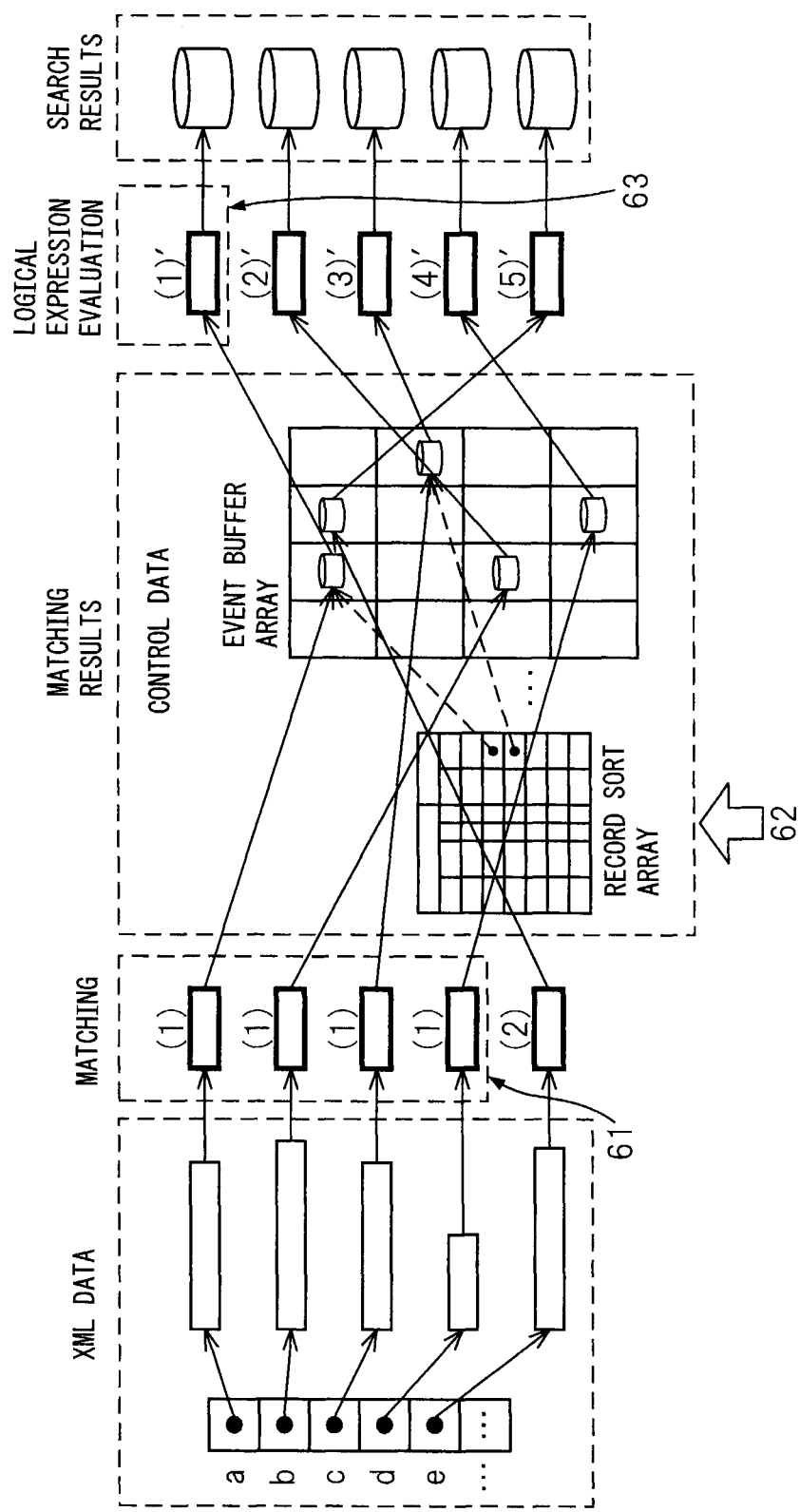
FIG. 6 is a diagram schematically illustrating a processing sequence according to a search method of the present embodiments.

FIG. 6 is a diagram schematically illustrating the processing sequence according to the search method of the present embodiments.

As will be seen from a comparison between FIG. 6 and the previously given FIG. 4, four record matching operations are processed in parallel (1) by the four search cores SCs, as indicated at reference numeral 61. Further, with the construction of a record order holding array and a matching result holding buffer, as indicated at reference numeral 62, parallel processing is achieved, eliminating the need for maintaining the records in the order of matching. However, the logical expression evaluation operations need to be performed in sequence in the order of XML records by the CPU.

Figure 7:
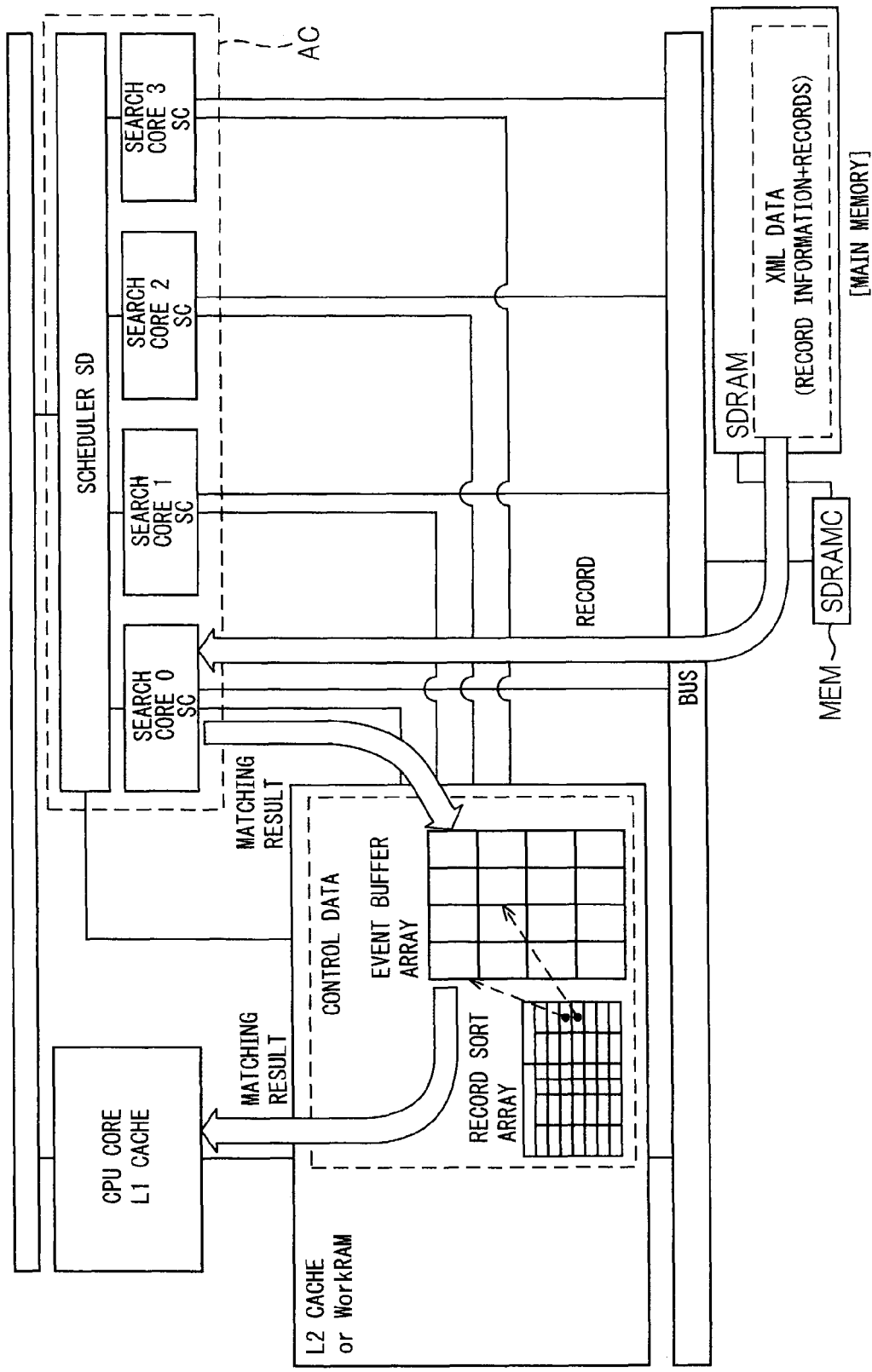
FIG. 7 is a block diagram illustrating a search device according to one embodiment.

FIG. 7 is a block diagram illustrating a search device according to one embodiment.

As illustrated in FIG. 7, XML data are stored in the form of records in a main memory (the XML database maintains data in units called records), and each search core SC autonomously accesses the main memory to read out records for matching and writes the result of the matching as hit information into shared data residing in an L2 cache or a work memory (work RAM) that may be accessed at high speed from the CPU.

Control data shared between the CPU and the accelerator AC are roughly divided into two arrays. One is the record sort array which holds record information (such as a pointer pointing to the beginning of each record), and the other is the event buffer array which holds the matching results.

The scheduler (scheduler circuit) SD monitors an idle state reported from each search core SC, passes the record information to an idle search core, and instructs the search core to perform matching. Using the hit information, the CPU performs the logical expression evaluation in parallel with the operation of the accelerator AC.

Figure 8:
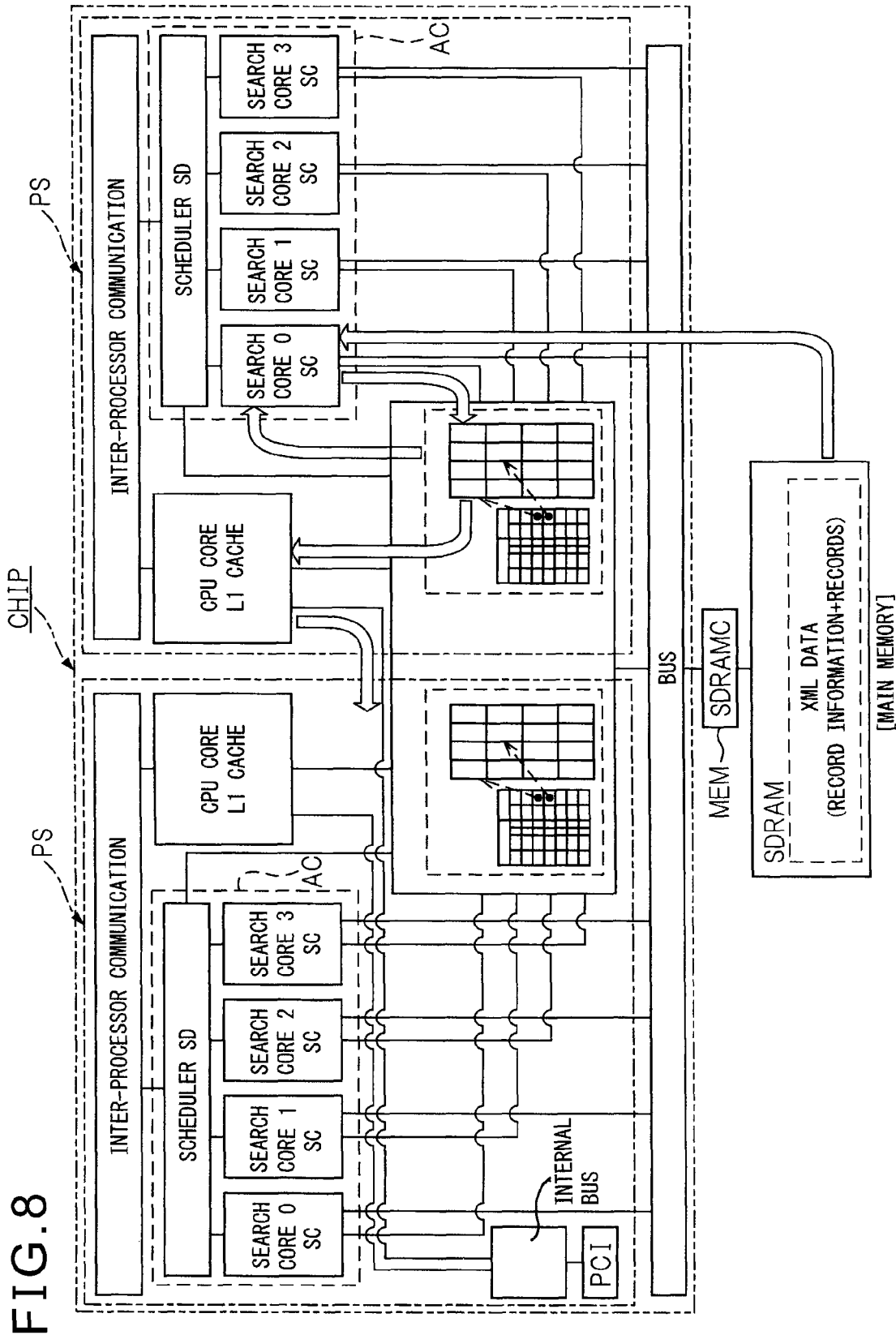
FIG. 8 is a block diagram illustrating a search device according to another embodiment.

FIG. 8 is a block diagram illustrating a search device according to another embodiment.

The embodiment illustrated in FIG. 8 is constructed from two blocks each identical to the one illustrated in FIG. 7, and these two blocks are accommodated on a single chip.

As illustrated in FIG. 8, in this embodiment, the single semiconductor chip (LSI) CHIP contains two CPUs, two accelerators ACs, and two L2 caches, each identical to the corresponding component illustrated in FIG. 7. More specifically, the semiconductor chip CHIP contains two CPU systems PSs, and each CPU system PS includes a CPU core, an accelerator AC having a scheduler SD and a plurality of (in the figure, four) search cores SCs, and an L2 cache (or a work RAM).

The configurations illustrated in FIG. 7 and FIG. 8 are only examples, and the single semiconductor chip CHIP may be configured to contain, for example, two or four blocks each comprising a CPU and an accelerator AC having a scheduler SD and eight search cores SCs.

Figure 9:
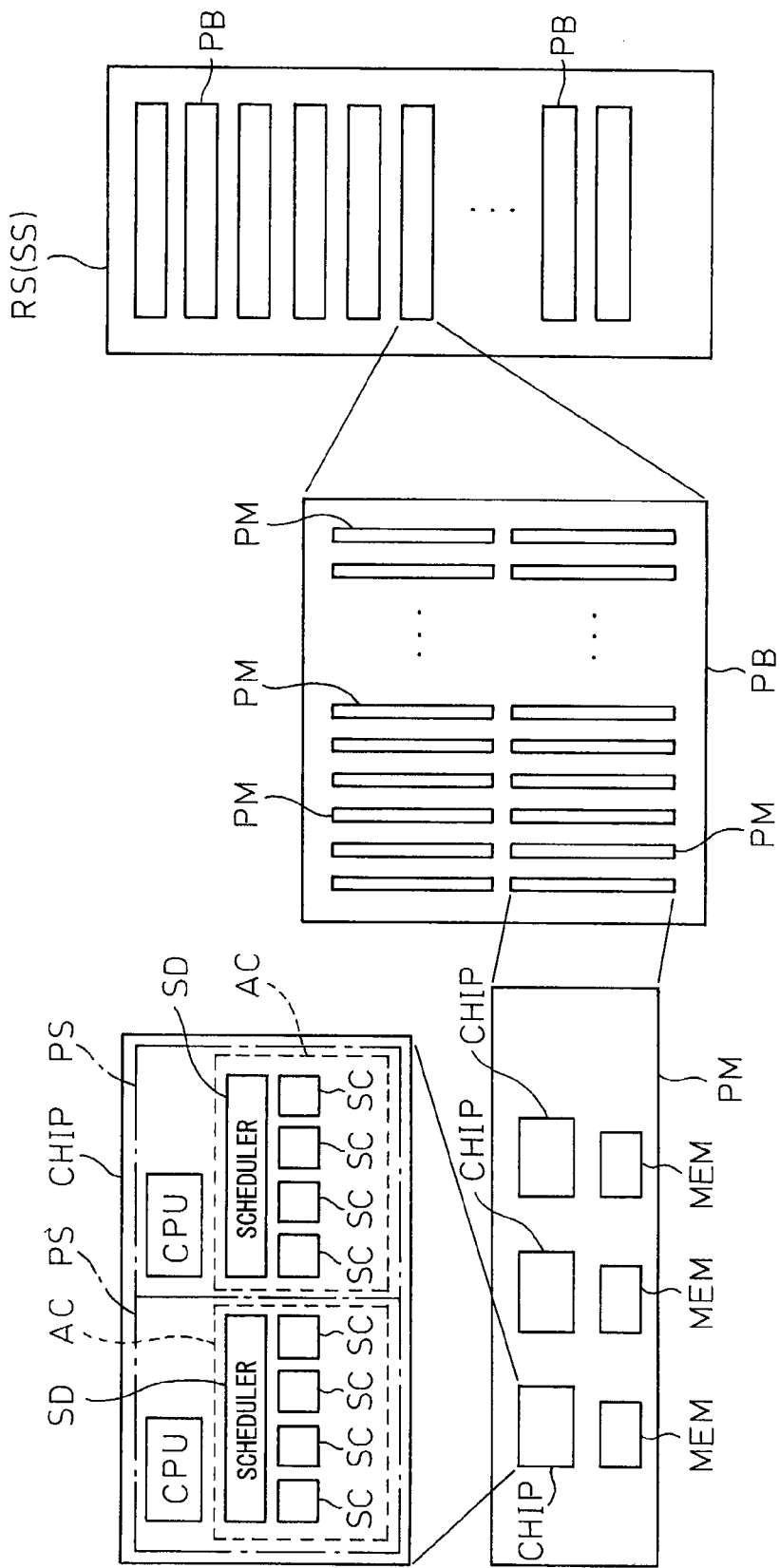
FIG. 9 is a diagram schematically illustrating one example of a search server to which each embodiment is applied.
Figure 10:
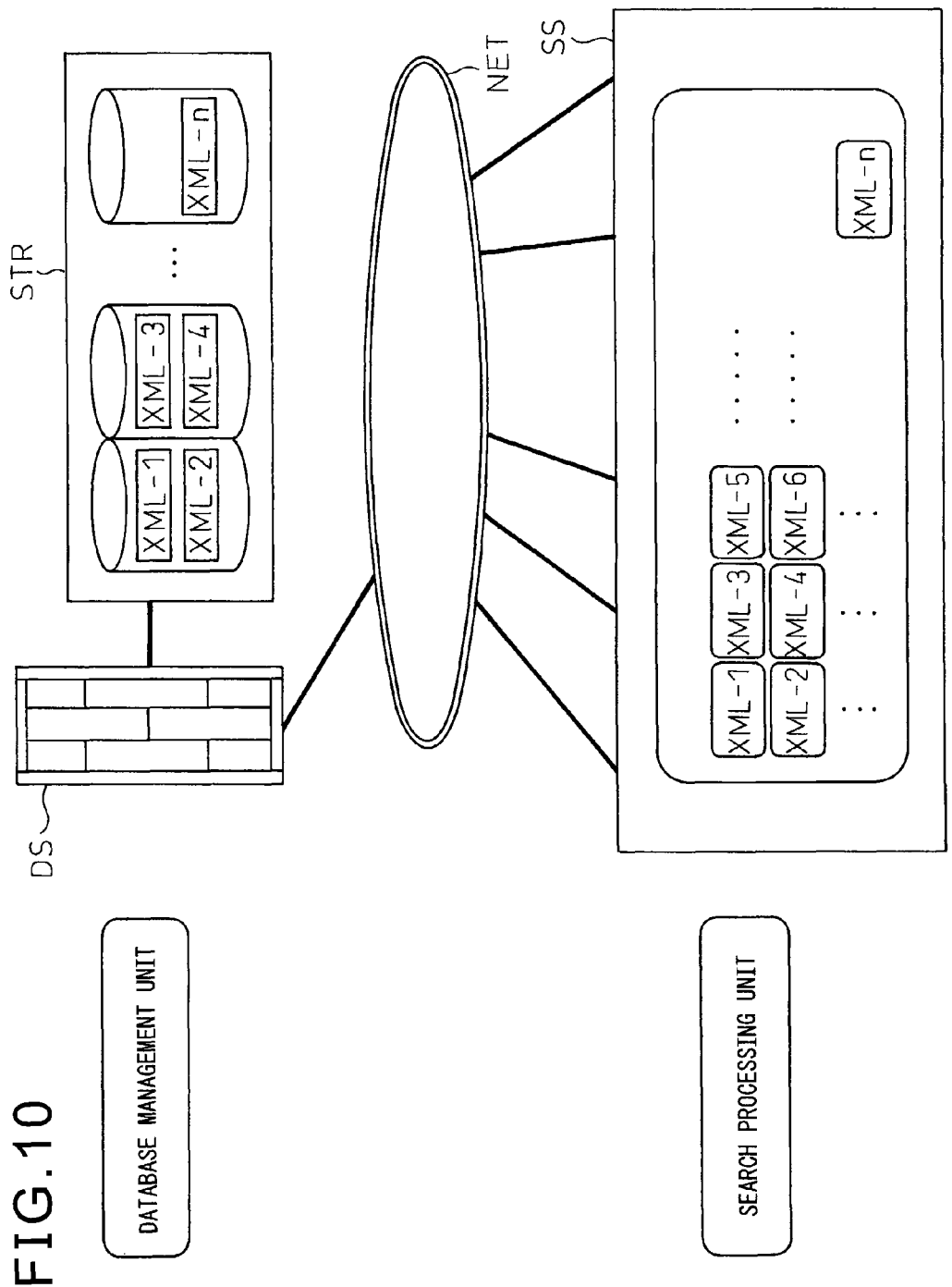
FIG. 10 is a diagram schematically illustrating the entire configuration of a search system including the search server of FIG. 9.

FIG. 9 is a diagram schematically illustrating one example of a search server to which each embodiment is applied, and FIG. 10 is a diagram schematically illustrating the entire configuration of a search system including the search server of FIG. 9. In FIG. 9 and FIG. 10, reference character SS denotes the search server, RS a rack system, PB a processor box, PM a processor module, and PS a processor system (search device).

In FIG. 9, the search server SS is constructed from one rack system RS which contains a plurality of (for example, 15) processor boxes PBs each accommodating a plurality of (for example, 28) processor modules PMs.

Each processor module PM includes three semiconductor chips CHIPs and three main memories, and each semiconductor chip CHIP contains two processor systems PSs each of which includes one CPU and an accelerator having a scheduler SD and four search cores SCs.

Here, the matching process may, for example, be performed on a record-by-record basis and in a random order (out of order) by each search core SC provided in each processor system PS, but the logical expression evaluation is performed, for example, by the CPU in the order of the XML data records.

Each search core includes, for example, an internal cache memory (temporary cache) that may be accessed at high speed, and an automaton is constructed and stored in this cache memory.

As illustrated in FIG. 10, a database management unit comprises a director server DS and a storage server STR, and a search processing unit comprises the search server SS. The search server SS is connected to the director server DS, for example, via a network NET such as a LAN, and processes text data stored, for example, in the storage server STR which is connected to the director server DS and in which structured document data such as XML are stored.

In this way, in the search server illustrated in FIG. 9, for example, processors equal in number to two CPU cores multiplied by the number of chips on the system divide the entire set of records contained in the XML data into the same number of blocks as the number of processors, and conduct search processing on the respective blocks separately.

More specifically, when the total number of CPUs is 256, and there are records with record IDs from 0000 to FFFF, then the records are grouped into 256 blocks, such as the first block with record IDs from 0000 to 00FF, the second block with record IDs from 0100 to 01FF, and so on, and each processor performs processing on a corresponding one of the blocks.

In the search system illustrated in FIG. 10, when the system is started up, the XML database stored in the storage STR is divided by the director server DS and distributed to the processors (CPUs) in the search server SS for storage in the corresponding memories.

When the search begins, first a search expression is sent to the search server SS, which then constructs an automaton and stores it in each accelerator AC. Then, each CPU that received the fraction of the XML database assigned to it feeds that fraction into the accelerator AC for matching.

The search server and the search system illustrated in FIG. 9 and FIG. 10 are only examples, and it will be appreciated that various modifications may be made according to the scale of the system applied. For example, in a larger scale system, the search server SS may be constructed from a plurality of rack systems RSs, and a plurality of director servers DSs may be provided to perform management.

FIG. 11 is a diagram illustrating the data structure of the XML data for explaining how each record is identified based on its record ID.

As illustrated in FIG. 11, each record is managed using an XML data table XDT, a record index table RIT, and a structure called memory data information MDI.

First, the XML data table XDT stores information about the entire XML data and contains a pointer to the record index table RIT.

The record index table RIT is an array of pointers to the memory data information MDI, and each element is identified by the high-order two bytes of its associated record ID.

The memory data information MDI is a structured array having record information of each record as a member, and each element is identified by the low-order two bytes of its associated record ID. Here, the record information contains a pointer to the record, the record being a unit on which the accelerator AC performs processing for matching.

As earlier described with reference to FIG. 6, the matching process may be performed on a record-by-record basis and in a random order (out of order), but the logical expression evaluation needs to be performed in the order of the XML data records.

FIG. 12 is a diagram for explaining the role of each module.

As illustrated in FIG. 12, the modules are broadly classified into software and hardware. The software is further classified into two categories, application and driver, and the hardware is also classified into two categories, scheduler SD and search core SC.

The application (SIGMA Evaluation) performs logical expression evaluation, and calls a SIGMA Buffer Full when a buffer full state is detected.

The driver is classified into SIGMA Search and SIGMA Buffer Full. The SIGMA Search refers to the XML index, extracts the pointers to the records in record order, and registers them into the sort array. A logical expression evaluation function is invoked by checking the buffer state at appropriate timing (polling). When the logical expression evaluation function is completed, the entries registered in the sort array up to that point are flushed. Then, at appropriate timing (for example, when the logical expression evaluation function is completed, the number of records so far evaluated is counted, and a threshold value is provided to start up), the record information is added to the sort array.

The SIGMA Buffer Full is called when the logical expression evaluation reaches the end of the event buffer. Then, the event buffer is flushed and, after waiting until the matching of the record currently under logical expression evaluation ends or until the next event buffer becomes full, the SIGMA Buffer Full is terminated.

If there is any search core SC in an idle state, the scheduler SD distributes to that search core SC the starting record information (pointer, etc.) registered in the sort array for the record yet to be processed for matching, and instructs the search core to start the search.

When the record information is received, the search core SC performs matching by reading the character string of the record from the memory. If a hit is detected, the matching result is written to the event buffer. Here, if a buffer run-over or the like occurs, the buffer state flag is appropriately changed. When the matching is completed, the search core SC reports the idle state to the scheduler SD and stops operation. In the event of an event buffer full or the like, the search core SC stalls and waits until the event buffer is flushed.

Next, the relationship between the application and the driver software of the accelerator AC will be described.

Figure 13:
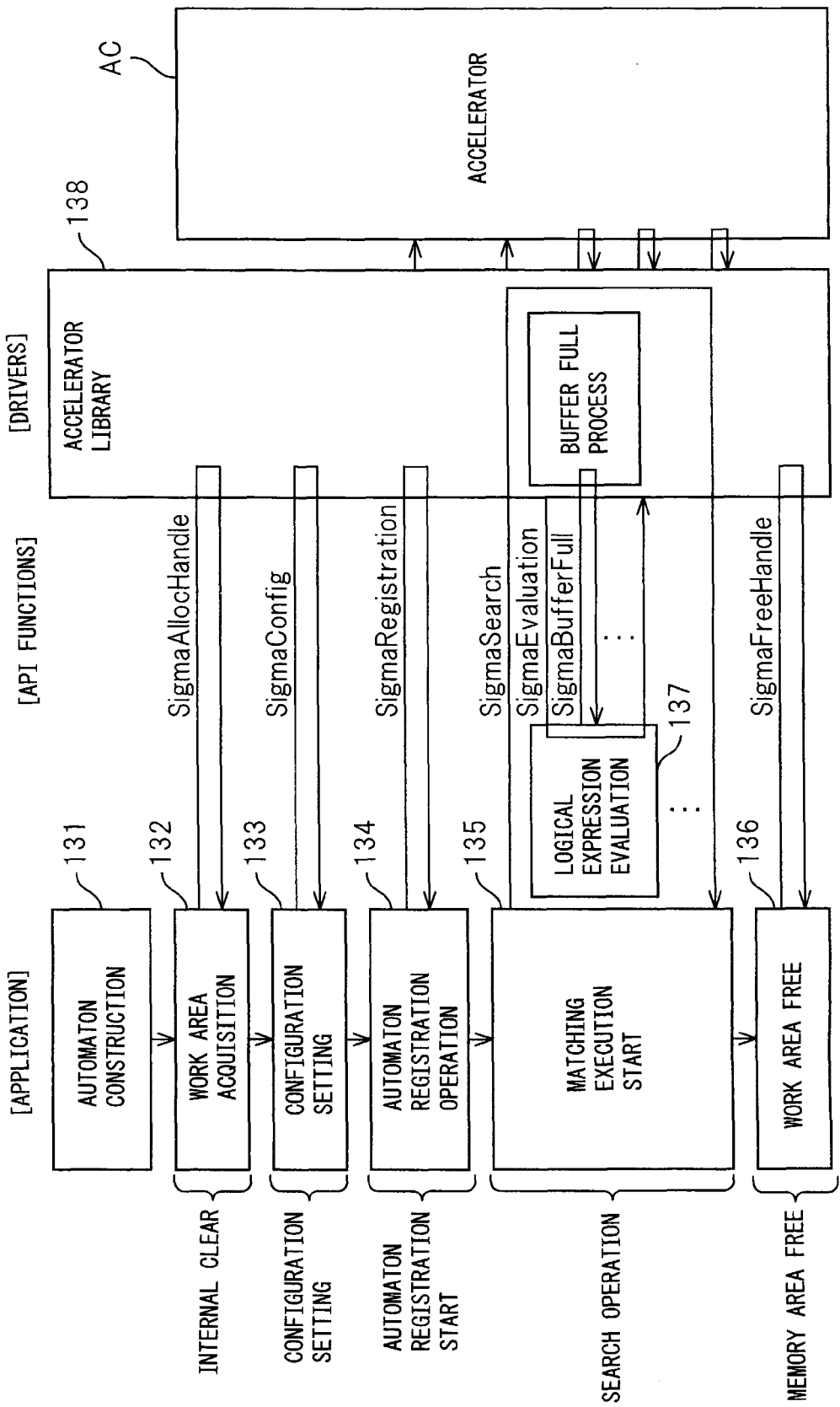
FIG. 13 is a diagram for explaining each API function and its call procedure.

FIG. 13 is a diagram illustrating the relationships between the application, API functions, drivers (accelerator library 138), and the accelerator AC, for explaining each API function and its call procedure.

As illustrated in FIG. 13, when a search expression is given, an automaton corresponding to it is constructed at the application side (131). Further, the initial setting (work area acquisition 132 and configuration setting 133) of the accelerator AC is performed by calling a SIGMA Alloc Handle function and a SIGMA Config function. Here, the SIGMA Config function may be called only when starting up the system.

Then, by calling a SIGMA Registration function, the constructed automaton is registered with the accelerator AC (134). Further, the search process proper is started (matching execution start 135) by calling a SIGMA Search function. The entire process of search is performed using this SIGMA Search function, and the application waits until the process is terminated.

Finally, a SIGMA Free Handle function is called to terminate the series of search operations (the work area is freed: 136). Here, the SIGMA Search function instructs the accelerator AC to perform the matching of records, and performs logical expression evaluation (137) by calling a SIGMA Evaluation function as each record becomes ready for logical expression evaluation. The SIGMA Buffer Full function is called when the event buffer used to hold the matching results switches from one buffer to another.

Next, the control method for the accelerator AC will be described.

First, a detailed description will be given of the control data, that is, the record sort array and the event buffer array. Further, of the various operations of the accelerator, the search operation (corresponding to the SIGMA Search function) as the main operation will be described, and the transition of the control as a whole will be briefly described. Then, the remaining operations, that is, the automaton registration operation (corresponding to the SIGMA Registration function) and the configuration setting operation (corresponding to the SIGMA Config function), will be described.

Figure 14:
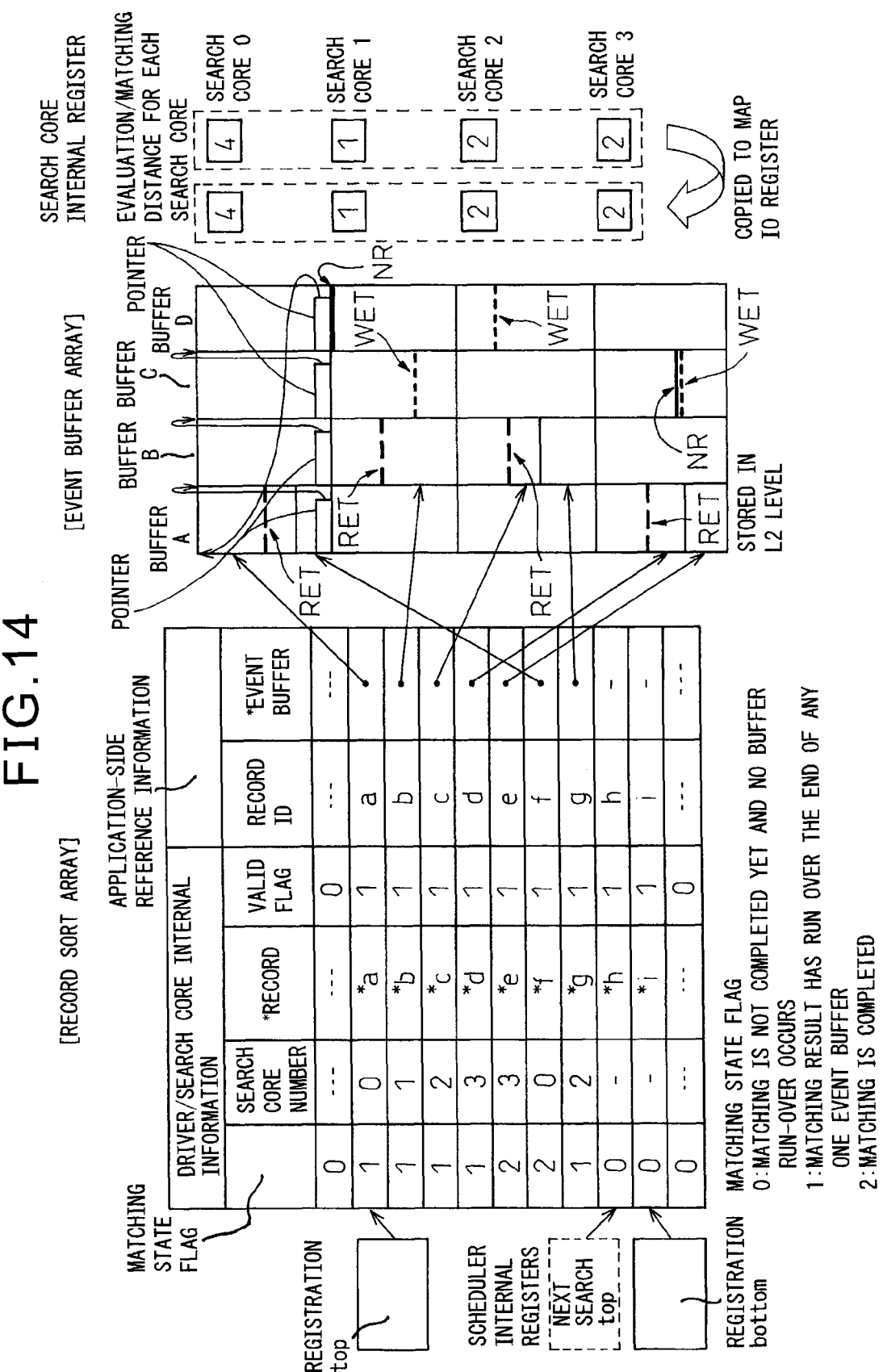
FIG. 14 is a diagram illustrating the detailed data structure of control data.

FIG. 14 is a diagram illustrating the detailed data structure of the control data.

First, as illustrated in FIG. 14, the control data are roughly divided between the record sort array which manages information for each record and the event buffer array to which the matching results from the search cores are written.

The rows in the record sort array store the records of the XML data in the index order of the XML data, and each row is freed as the matching and logical expression evaluation for the record stored therein are completed; then, when the bottom row is reached, the process returns to the top row in a cyclic manner.

Entries in the array include the following meanings.

Matching state flag: This flag records the matching state of the record processed by the search core and is used to determine whether the logical expression evaluation may be resumed after flushing the buffer. The flag takes one of the following states.

0: Matching is not yet completed and the matching result does not run over the end of the event buffer.

1: Matching result runs over the end of any one event buffer.

2. Matching is completed.

Search core number: The number designating the search core used or to be used for the matching of the record, and used when flushing the buffer.

*Record: Pointer to the starting address to the record in the XML data, the pointer being passed to the search core for use when starting the matching operation. In the following, "*" indicates the address.

Valid flag: This flag indicates whether the corresponding row is used or not, and is used to check whether it is valid or not when the scheduler fetches that row into its own buffer.

0: Not used.

1: Used.

Record ID: Used in the logical expression evaluation and not directly relevant to the control of the present embodiment.

*Event buffer: Pointer to the event buffer area where the matching result is stored, and used in the logical expression evaluation.

Two pointer variables, "*Registration Top" and "*Registration Bottom", indicate the starting address and end address, respectively, of the currently used rows, and are held by the driver function SIGMA Search. A pointer variable "Next Search Top" indicates the starting address of the rows currently registered but yet to be processed for matching, and is held in a register within the scheduler.

The matching results from the search cores are written to the event buffer array. FIG. 14 illustrates the case where the number of search cores used is four (search cores SCs designated by 0, 1, 2, and 3, respectively) and four event buffers areas (A, B, C, and D) are allocated to each search core.

In the entry at the end of each event buffer, a pointer to the next event buffer (for example, B in the case of A, C in the case of B, and so on) is written in advance. Then, as illustrated in the event buffers for the search core 0 in FIG. 14, for example, provisions are made so that the search core and the logical expression evaluation function (SIGMA Evaluation) may move by themselves to the next buffer.

In FIG. 14, coarse dashed line RET indicates the position of the last entry currently referred to in the logical expression evaluation, and fine dashed line WET indicates the last entry WET to which the matching result is currently written by the search core. Solid line NR indicates that the matching of the record is not yet completed. It is assumed here that the number of buffers is actually two.

Another data for control is the buffer distance. This indicates the distance between the event buffer currently used by the search core and the event buffer currently used in the logical expression evaluation; for example, for the search core 0 in FIG. 14, "4" is written. This data is stored in a register within the search core, and the value is incremented by "1" (+1) each time the search core moves from one event buffer to the next and decremented by "1" (−1) each time any one event buffer is flushed.

Since the above data is not only referred to for the control of the search core operation but also referred to from the driver (CPU side) to check the operation when flushing the buffer, the data is copied to a map IO register maintained in the scheduler (SD) (or the buffer distance register of the search core is placed in a memory map).

Figure 15:
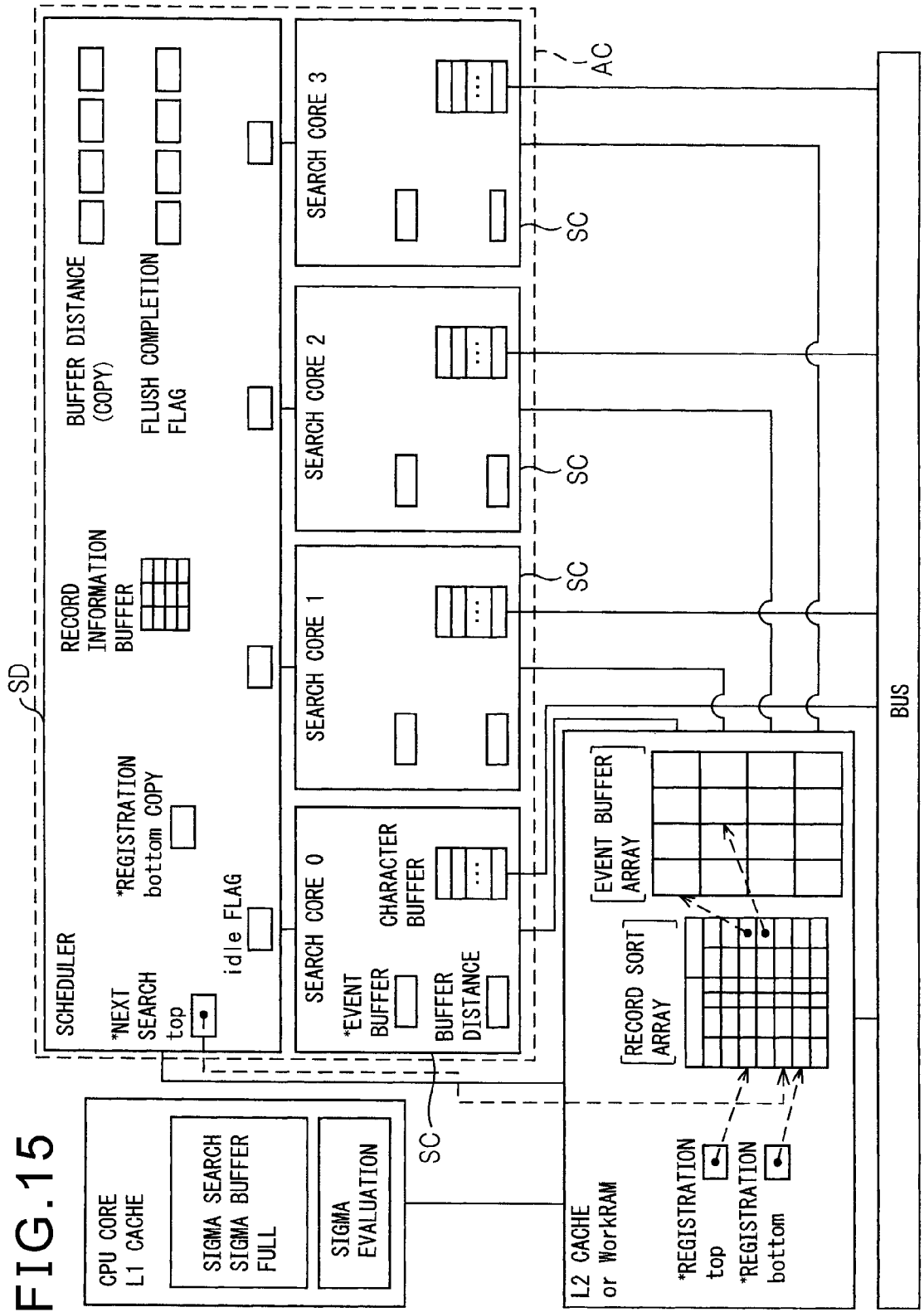
FIG. 15 is a diagram for explaining the structure of shared data.

FIG. 15 is a diagram for explaining the structure of the shared data (the arrangement of the control data).

As illustrated in FIG. 15, the record sort array and the event buffer array are placed in the L2 cache or the work RAM area.

The original of the buffer distance is held in the search core (SC), and the copy of the buffer distance is held in the scheduler (SD). Next Search Top is placed within the scheduler. The internal registers of the search core SC and the scheduler are also depicted in FIG. 15 in order to explain the search operation later.

The scheduler includes the following meanings.

Idle flag: Indicates the state of each search core.

0: Idle state

1: Busy state

*Next Search Top: A register that indicates the entry address in the sort array at which the record information of the record to be matched next is stored.

Record information buffer: A buffer for temporarily storing the entries of the record sort array. Actually, there are as many buffers as there are search cores. Information equivalent to the number of buffers are read from *Next Search Top, but if the valid flag in the sort array is "0", the information is discarded, and *Next Search Top is read after an appropriate number of cycles.

Buffer distance copy: Holds the copy of the buffer distance of each search core.

Flush completion flag: Used to wait for an event buffer flush.

*Registration Bottom copy: Holds a copy of *Registration Bottom variable. Used to prevent Next Search Top from overtaking when the scheduler buffers the record information.

Each search core includes the following meanings.

Character buffer: A buffer with several tens of bytes of capacity for temporarily storing the record to be matched. The search core retrieves one character at a time from this buffer and performs matching by causing the automaton to make a transition.

*Event buffer: A pointer to the event buffer to which the search core writes the record matching hit information.

Buffer distance: Used for synchronization between the logical expression evaluation and the matching operation, and indicates the distance in terms of the number of buffers between the position currently being read for the logical expression evaluation and the position at which the matching result is written in the event buffer allocated to the search core. The initial value is "0", and the write operation is performed only by the search core. When the end of the current buffer is reached during the writing of the matching result, the value is incremented by "1" (+1), and when an event buffer flush instruction is given, the value is decremented by "1" (−1).

Figure 16:
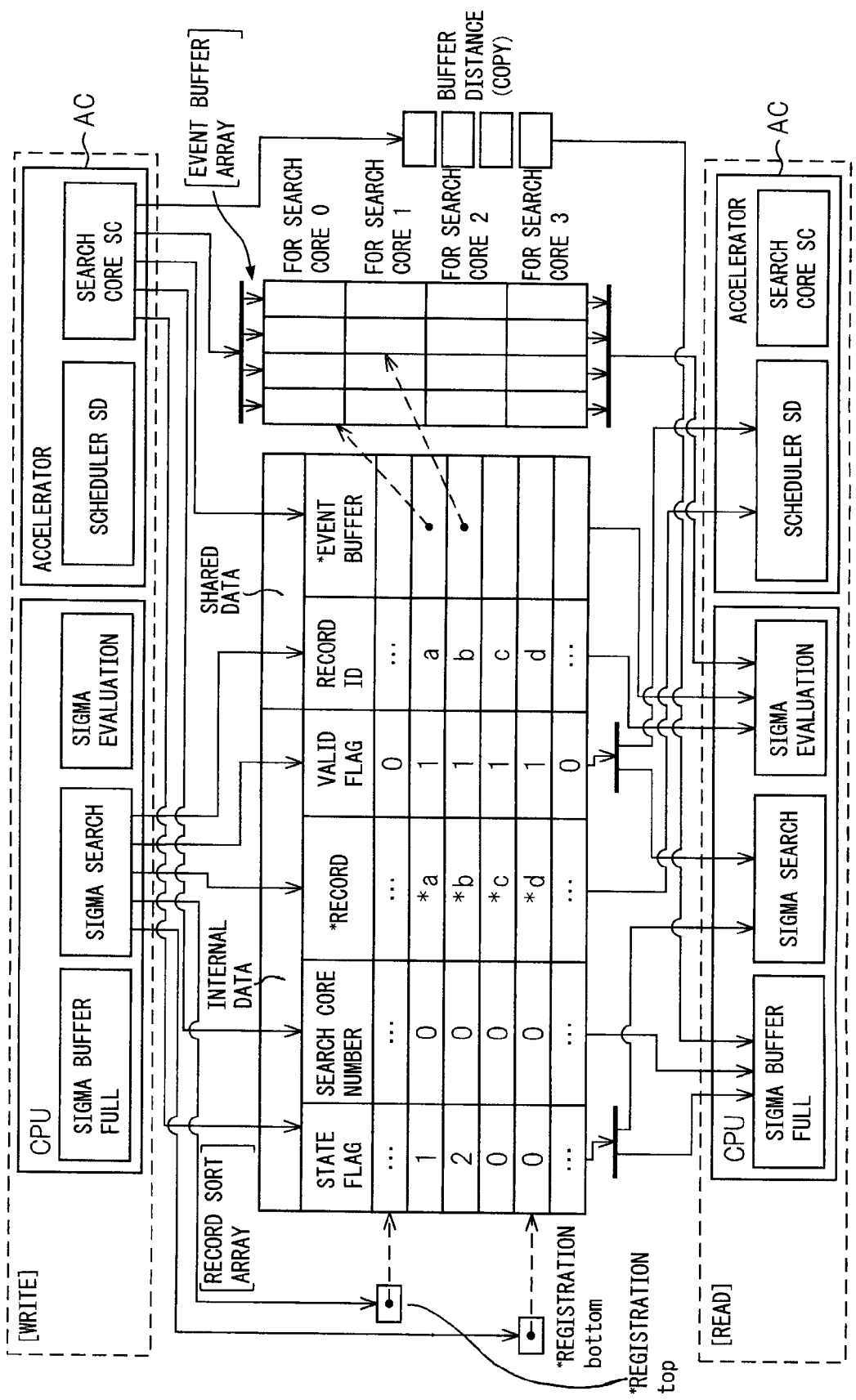

FIG. 16 and FIG. 17 are diagrams for explaining the relationship between data read and write operations.

As illustrated in FIG. 16, many data writes occur from the SIGMA Search to the record sort array; this is because the SIGMA Search extracts record information by referring to the XML data index and stores it in the sort array. Here, what the search core writes to the record sort array is the record management information determined when starting the record matching operation, and what the search core writes to the event buffer array is the matching hit information.

When reading data, the SIGMA Search checks the state flag in the sort array to determine whether the SIGMA Evaluation may be started or not. The SIGMA Evaluation retrieves from the sort array the record management information that becomes preferable when starting the logical expression evaluation, and reads the event buffer to retrieve the hit information for the logical expression evaluation The SIGMA Buffer Full retrieves from the sort array the information (record ID and *Event buffer) that becomes preferable for control in the event of a buffer full. The scheduler retrieves from the sort array the information (*Record) that the search core uses when starting the matching operation.

Next, a description will be given of the search operation which is the main operation of the accelerator (from the time the SIGMA Search function is called until the time the function is completed).

First, event buffer control (the method of synchronizing the event buffer read/write operations) will be described.

As illustrated in FIG. 16 and FIG. 17, the event buffer is a buffer that stores a matching result; when a hit is detected in the matching operation, the result is written from the search core directly to the event buffer, and the result is read out by the logical expression evaluation function for use.

The event buffer is a memory area allocated to each search core, and is used by dividing the area into two or more event buffers. Since the area is limited, the buffer may eventually be flushed for reuse. This buffer flush is synchronized using the SIGMA Buffer Full function.

The conditions that need to be checked here are as follows.
A) Determines whether the SIGMA Evaluation function may be started or not.
B) Determines whether the SIGMA Buffer Full function may be terminated or not (the SIGMA Evaluation may be resumed or not).
C) Writes the matching result from the search core and determines whether overtaking occurs or not.

In some cases, event buffer run-over information alone may not suffice for the purpose, but two kinds of information may become preferable, i.e., the buffer run-over information and the information indicating that the matching of the record is completed. For example, suppose that the buffer distance alone was available and this buffer distance was 2 or greater, and suppose that the logical expression evaluation was allowed to continue into the next buffer; in this case, if the matching of a record that would run over two event buffers (a record that would use two and a half event buffers) was completed, and the search core was held in an idle state after the matching of the record, then a deadlock would occur.

In view of this, when performing the above process, the control method of the present embodiment uses the earlier described state flag (control data) in addition to the buffer distance (held in the internal register of the search core and copied to the IO register).

Operation rules for the variables will be described below.
First, the rule for the buffer distance is as follows.
When the matching reaches the buffer end, the value is incremented by "1" (+1).
When notification is received from the SIGMA Buffer Full, the value is decremented by "1" (−1).

The rule for the state flag is as follows.
The initial state is "0".
When the matching runs over the end of an event buffer, the flag is set to "1".
When the matching is completed, the flag is set to "2".
The conditions that need to be checked here are as follows.
A) Determines whether the SIGMA Evaluation function may be started or not.
May be started if the record state flag from the start of the sort array is not "0".
B) Determines whether the SIGMA Buffer Full function may be terminated or not (the SIGMA Evaluation may be resumed or not).
May be terminated if the buffer distance is "2" or greater (before buffer flushing).
May be terminated if the buffer distance is "1" or greater (after buffer flushing).
May be terminated if the record state flag is "2".
C) Writes the matching result from the search core and determines whether overtaking occurs or not.
No overtaking occurs if the buffer distance is smaller than the number of event buffers (four in the example of FIG. 16).

Next, the search operation will be described with reference to two examples. One is the example of normal operation when no event buffer flush occurs, and the other is the example of operation when an event buffer flush occurs.

Figure 18A:
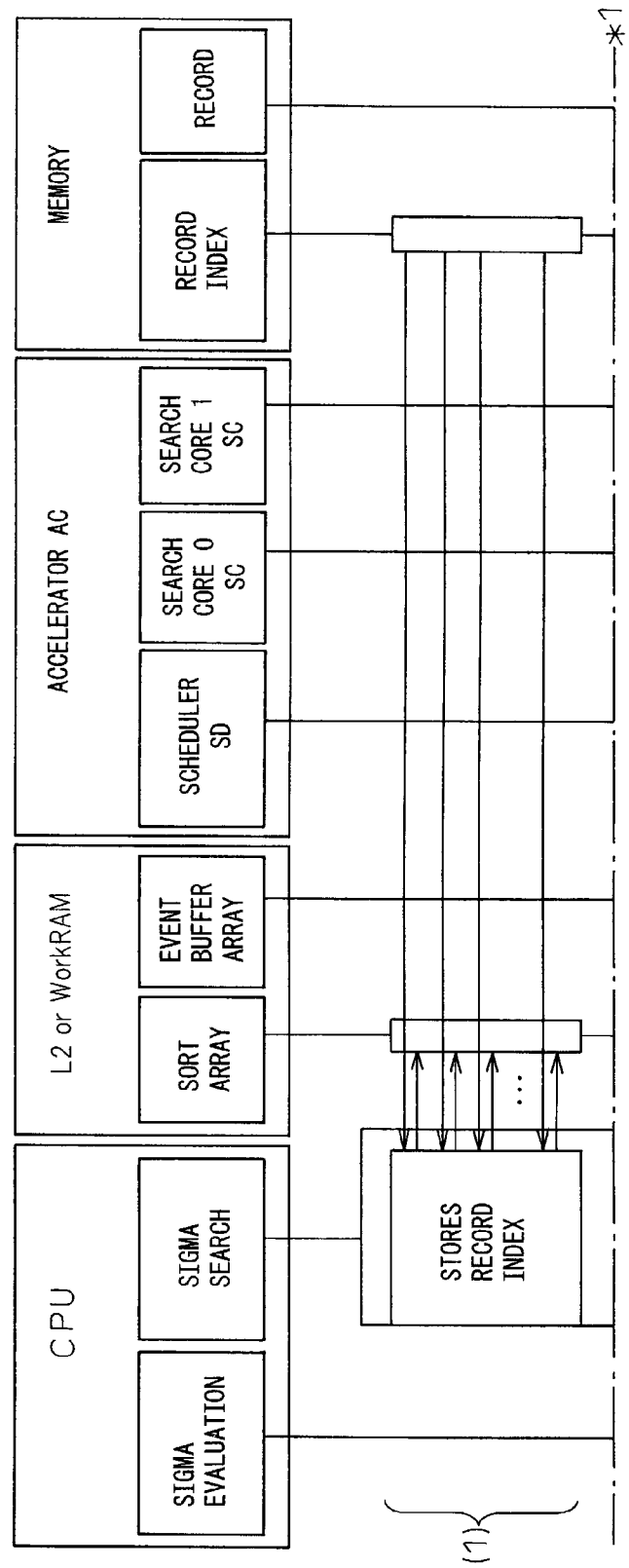

FIG. 18A, FIG. 18B and FIG. 18C are diagrams for explaining the operation of the scheduler, illustrating how the operation proceeds as the time elapses in the search process.

In FIG. 18A, FIG. 18B and FIG. 18C, the blocks (CPU, L2 cache (or work RAM), accelerator, and memory) in the upper part of the diagram illustrate the hardware categories, and the smaller blocks contained therein indicate the operating entities. To simplify the explanation, the configuration having two search cores SCs (search cores 0 and 1) is illustrated in FIG. 18A, FIG. 18B and FIG. 18C, and it is assumed that the records are arranged in the order of A, B, C, and so on.

That is, the condition is that the number of search cores is two and the order of the records is A, B, C, and so on, and the situation is such that if the matching of the record B is completed, the evaluation waits since the matching of the record A is not completed yet and, if the matching of the record D is completed, the evaluation waits since the matching of the record C is not completed yet.

Next, a description will be given of the operation of the operating entities in each of the time segments (1) to (6) illustrated at the left of FIG. 18A, FIG. 18B and FIG. 18C.

In time segment (1)
SIGMA Search: When the SIGMA Search function is started, it sequentially scans the record index of the XML data stored in memory, and extracts the record information equivalent to the number of entries stored in the sort array. Then, the Registration Top and Bottom pointers are changed accordingly. At this stage, the Registration Top points to the first entry, and the Registration Bottom points to the entry at the bottom. Then, the Registration Bottom is copied to the Registration Bottom in the map IO register maintained in the scheduler.
SIGMA Evaluation: Does not exist.
Scheduler: Idle mode.
Search cores: Idle mode.
In time segment (2)
SIGMA Search: Switches the scheduler to the search mode, and starts to wait for logical expression evaluation to become possible. Polls the record state flag in the sort array entry (where the record information of the record A is stored) pointed to by the Registration Top pointer. Since, at this time, the flag is "0", nothing is done.

SIGMA Evaluation: Does not exist.

Scheduler: Switches to the search mode, and fetches two pieces of record information from the sort array entry pointed to by the Search Top register into the record information buffer (there are as many as buffers as there are search cores) maintained in the scheduler. The Search Top register is incremented by "2" (the pointer is moved forward by two entries).

Further, the idle flag of each search core is checked; here, since the search cores 0 and 1 are both in the idle state, the scheduler passes the record information (pointer to the record and pointer to the sort array entry) to each search core, instructs the search cores to start the matching operation, and sets their idle flags to the busy state. Then, the record information is again buffered into the scheduler in the same manner as described above.

Then, the scheduler again monitors the idle flag register, and waits until it becomes possible to distribute the next record to any one of the search cores. Since, at this time, the search cores are both in the busy state, the scheduler waits until the state changes to the idle state.

Search cores: The search cores 0 and 1 each perform the matching operation starting from the pointer to the record passed from the scheduler. First, the search core number and the contents of the *Event buffer register maintained in each search core are written to Search core number and *Event buffer at the entry pointed to by the *Sort array passed from the scheduler. Further, data (character string equal to character buffer size) of several tens of consecutive bytes (character buffer size) from *Record is fetched from the memory into the character buffer maintained in each search core.

Then, the search core retrieves one character at a time from the character buffer and causes the automaton prestored in the search core to make a transition. If the automaton illustrates a hit state, the search core writes the hit information to the event buffer entry pointed to by the *Event buffer register maintained in the search core, and increments the *Event buffer register by "1". This operation is repeated each time a hit occurs. However, depending on the write mode at the time of the hit, the hit information may be overwritten or not written.

Here, before the character buffer empties, the next string of several tens of bytes is fetched into the buffer to prevent the search core from stalling. Eventually, the record end will be reached, but the search core may determine by itself whether the end is reached or not by monitoring the record character string.

When the end is reached, the search core reports the idle state to the scheduler (the idle state is written to the idle flag in the scheduler), and at the same time, the record state flag in the sort array is set to "2" (record matching completed). Since, at this time, neither the search core 0 nor the search core 1 yet completes the matching operation, the record reading and the automaton transition are continued.

In time segment (3)

SIGMA Search: Continues polling as in (2). By this time, the matching of the record B is completed, but the polling continues because the matching of the first record A is not yet completed.

SIGMA Evaluation: Does not exist.

Scheduler: Monitors the idle flag of each search core in each cycle. Before long, the idle flag of the search core 1 changes to "0 (idle state)", whereupon the scheduler passes the record information of the third record C to the search core and instructs it to start the matching operation. Further, as in (2), the idle flag of the search core 1 is set to "1 (busy state)", and the record information for one record is again fetched from the sort array into the buffer.

Search cores: The search cores 0 and 1 each continue to perform the character string reading and the automaton transition, and if a hit is detected, the hit information is written to the event buffer. Before long, the search core 1 completes the matching of the record, whereupon the idle flag in the scheduler is set to "0 (idle state)", and "2" is written to the record state flag at the entry pointed to by the *Sort array passed from the scheduler.

In time segment (4)

SIGMA Search: Continues polling as in (2). By this time, the record state flag of the record A changes to "2", which means that the record is ready for logical expression evaluation. The process proceeds to check the flag at the next entry and, since the second entry is also ready for logical expression evaluation, the SIGMA Evaluation is started to perform the logical expression evaluation of the records A and B (the address of the sort array entry of the record A and the number of records ready for evaluation, i.e., 2, are passed as arguments to the SIGMA Evaluation).

SIGMA Evaluation: Performs the logical expression evaluation of the records A and B by retrieving the matching results from the event buffers using the *Event buffers in the sort array. The record ID is used in this process, but includes no relevance to the accelerator. At this time, the logical expression evaluation is not yet completed.

Scheduler: The operation is the same as in (3). Here, since the matching of the record A by the search core 0 is completed, the scheduler distributes the next record D to the search core 0, instructing it to start the matching of the record. As in (3), the process waits the distribution of the next record.

Search cores: The operation is the same as in (3). The search core 0 assigned the next record D starts the matching of the record, while the search core 1 continue the matching of the record C.

In time segment (5)

SIGMA Search: Does nothing.

SIGMA Evaluation: Continues the logical expression evaluation.

Scheduler: The operation is the same as in (3). Here, since the matching of the record D by the search core 0 is completed, the scheduler distributes the next record E to the search core 0, instructing it to start the matching of the record. As in (3), the process waits the distribution of the next record.

Search cores: The operation is the same as in (3). The search core 0 assigned the next record E starts the matching of the record, while the search core 1 continue the matching of the record C.

In time segment (6)

SIGMA Search: The process is returned from the SIGMA Evaluation. Since the entries where the records A and B were stored in the sort array are now freed, the SIGMA Search refers to the index of the XML data, as in (1), and loads the next two consecutive pieces of record information into the sort array. The Search Top is incremented by "2", and the Search Bottom is also incremented by "2" (if the last element in the array is reached, the process returns to the top element in a cyclic manner).

The Search Bottom is copied to the map register in the scheduler. Again, the process waits for the logical expression evaluation to become possible, and polls the state flag of the record C; here, since the flag is "2", the logical expression evaluation may be immediately started. As in (4), the SIGMA Evaluation is started by specifying the records C and D.

SIGMA Evaluation: Continues the logical expression evaluation of the records A and B and completes the evaluation. After that, the SIGMA Evaluation is called again, to start the logical expression evaluation of the records C and D.

Scheduler: The operation is the same as in (3). Here, since the matching of the record C by the search core 1 is completed, the scheduler distributes the next record F to the search core 1, instructing it to start the matching. As in (3), the process waits the distribution of the next record.

Search cores: The operation is the same as in (3). The search core 1 assigned the next record F starts the matching of the record, while the search core 0 continue the matching of the record E.

In the above process, the section SSR of the SIGMA Search enclosed by dashed lines in FIG. 18A, FIG. 18B and FIG. 18C and the section SDR of the scheduler enclosed by dashed lines are repeatedly performed. In this way, in the matching process, irrespective of the order of the records and irrespective of whether the matching of the preceding record is completed or not, the matching of the next record is started as soon as the search core becomes idle (see arrows LB). On the other hand, the logical expression evaluation needs to be performed by waiting until each record becomes ready in record order (see arrows LR). This control is performed using the sort array.

Further, while the embodiment illustrated in FIG. 18A, FIG. 18B and FIG. 18C is described for the case where the technique of polling is used to check the information (the state flag at the *Registration Top) used to determine whether the logical expression evaluation may be performed or not, it will be appreciated that provisions may be made to be able to use hardware interrupts.

Figure 19A:
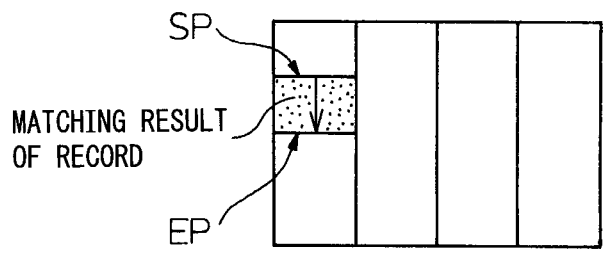
FIG. 19A, FIG. 19B and FIG. 19C are diagrams for explaining the problems associated with event buffer control.
Figure 19B:
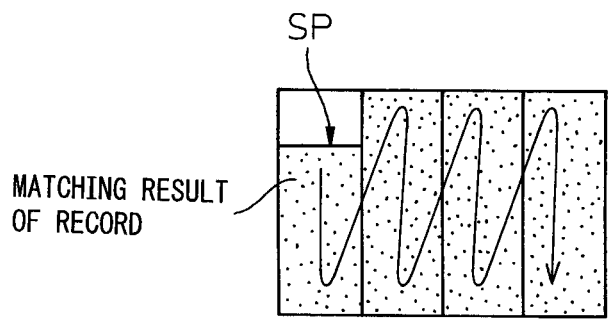
Figure 19C:
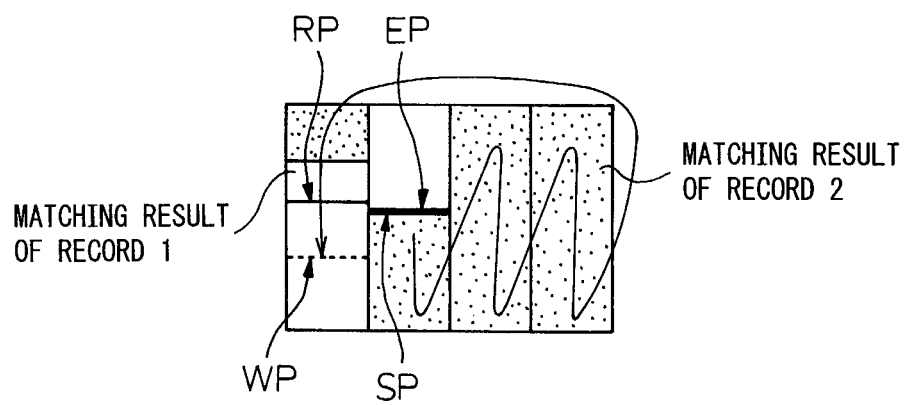

FIG. 19A, FIG. 19B and FIG. 19C are diagrams for explaining the problems associated with the event buffer control by dealing with the case where the event buffer is constructed from four buffers. That is, since the event buffer is limited in capacity, it is not possible to control it using only the matching completion flag in the record buffer. In FIG. 19A, FIG. 19B and FIG. 19C, reference character SP indicates the starting point of the matching result, EP the endpoint of the matching result, WP the matching result write position, and RP the matching result read position.

First, there will be no problem if the matching result is accommodated within one buffer, as illustrated in FIG. 19A.

A first problem occurs if the matching result exceeds the combined capacity of all the buffers, as illustrated in FIG. 19B; in this case, the logical expression evaluation does not start, and the process comes to a standstill.

A second problem occurs if the writing overtakes the reading, as illustrated in FIG. 19C; in this case, it becomes preferable to synchronize the matching and the logical expression evaluation operations.

Figure 20A:
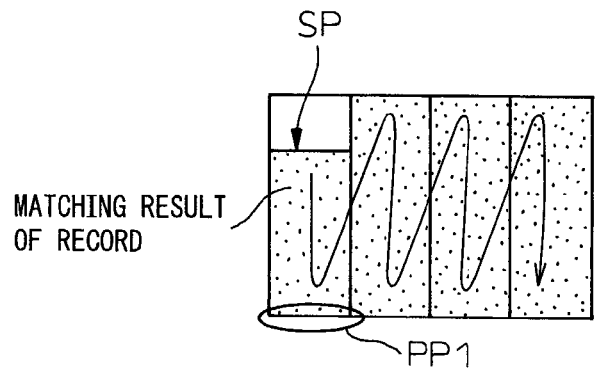
FIG. 20A, FIG. 20B and FIG. 20C are diagrams for explaining the relationship between data read and write operations.
Figure 20B:
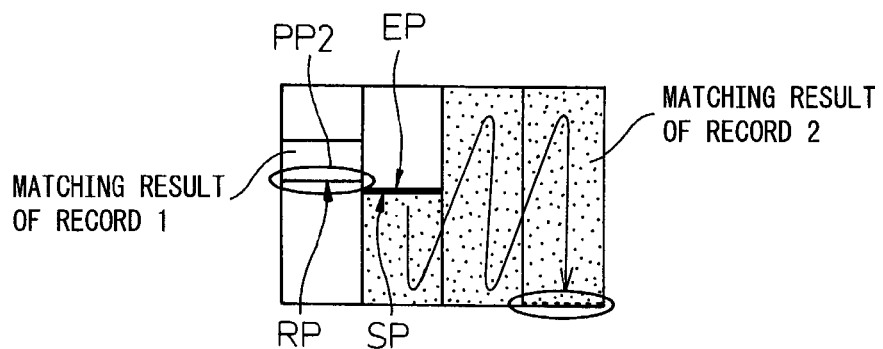
Figure 20C:
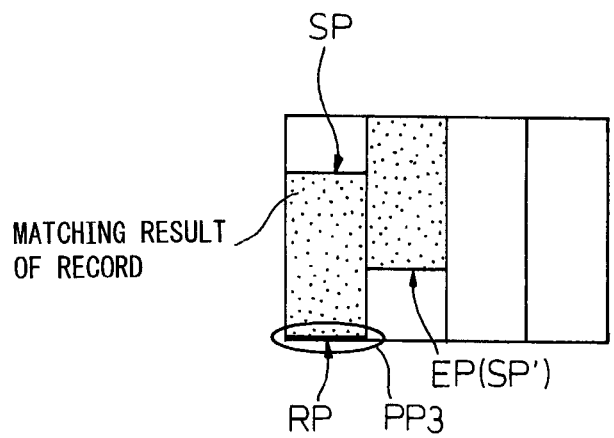

FIG. 20A, FIG. 20B and FIG. 20C are diagrams for explaining the relationship between data read and write operations, illustrating how a buffer flush is managed by starting the logical expression evaluation on a buffer-by-buffer basis.

First, when the matching result exceeds the combined capacity of all the buffers as illustrated in FIG. 19B (the first problem), information indicating that the matching reaches the end of one event buffer is appended to the matching information flag, as indicated at PP1 in FIG. 20A, and it is determined that upon reaching the end, the logical expression evaluation may be started.

Next, when the writing overtakes the reading as illustrated in FIG. 19C (the second problem), a register for holding the distance between the matching and the logical expression evaluation is added, as indicated at PP2 in FIG. 20B, thereby preventing the overtaking of the matching on a buffer-by-buffer basis.

Further, when the logical expression evaluation reaches the end of one event buffer, as indicated at PP3 in FIG. 20C, the buffer may be flushed.

Each event buffer (a local memory, for example, an L2 cache memory), in which the matching result (logical expression evaluation) of a record assigned to a given search core is recorded, carries at its endpoint EP a pointer (SP') pointing to the beginning of the next event buffer (memory area).

Figure 21:
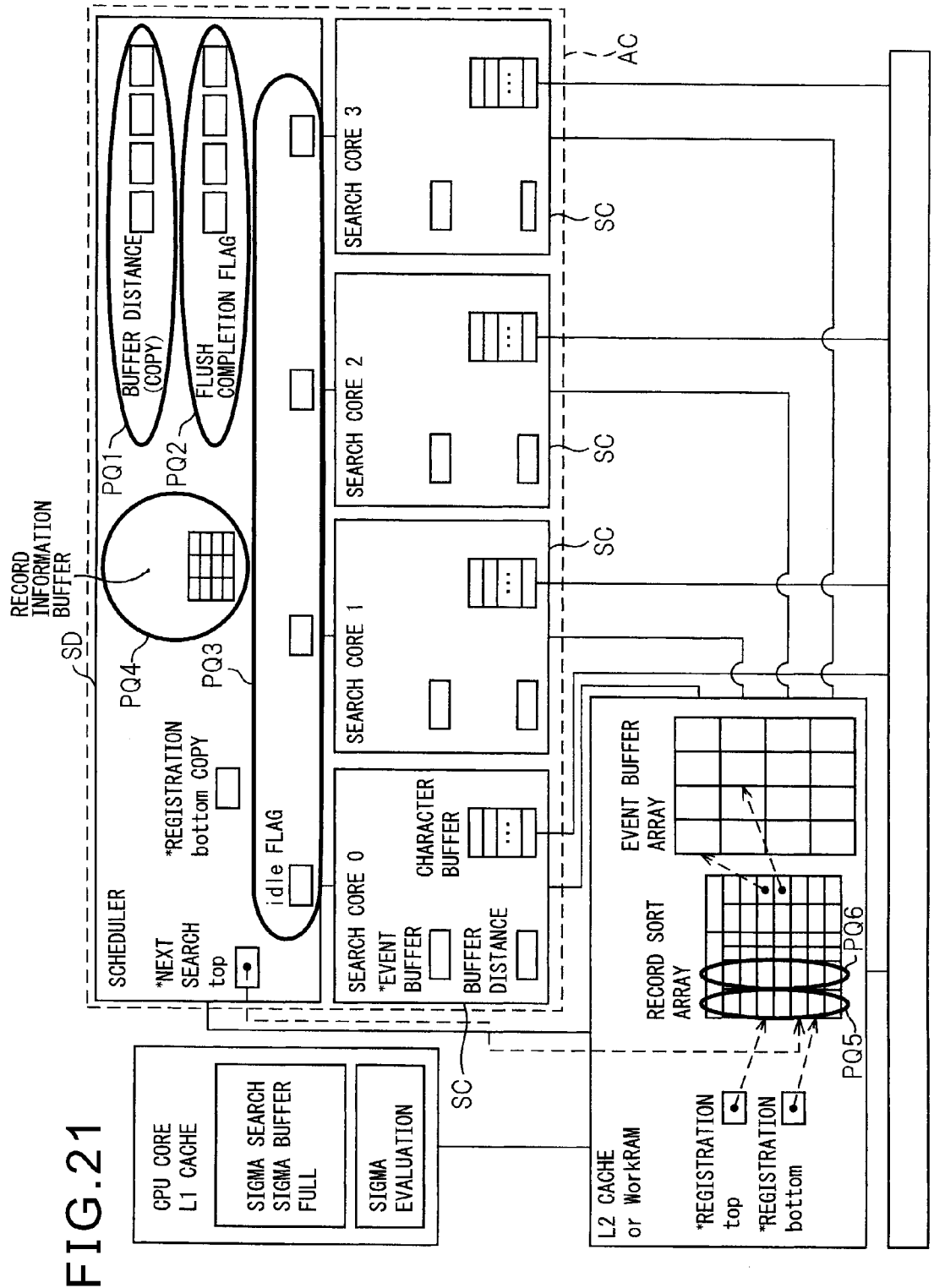
FIG. 21 is a diagram for explaining event buffer control information.

FIG. 21 is a diagram for explaining the event buffer control information, and corresponds to the previously given FIG. 15.

As illustrated in FIG. 21, the buffer distance used to synchronize the logical expression evaluation and the matching operations is stored in the buffer distance register PQ1 maintained in the scheduler SD, and the flush completion flag used to wait for an event buffer flush is stored in the flush completion flag PQ2 maintained in the scheduler SD.

The idle state (empty state) of each of the search cores SCs (search cores 0 to 3) is held in the register PQ3 maintained in the scheduler SD so that the scheduler SD may identify an idle core.

The management information for managing the plurality of records in the shared data is temporarily held in the buffer PQ4 maintained in the scheduler SD.

Further, the matching state flag that records the matching state of the record processed by the search core, and that is used to determine whether the logical expression evaluation may be started or whether the logical expression evaluation may be resumed after a buffer flush, is stored, for example, in PQ5 in the L2 cache. The search core number, which is the number of the search core that performs or performed the matching of a record, and which is used when flushing a buffer, is stored, for example, in PQ6 in the L2 cache.

Figure 22A:
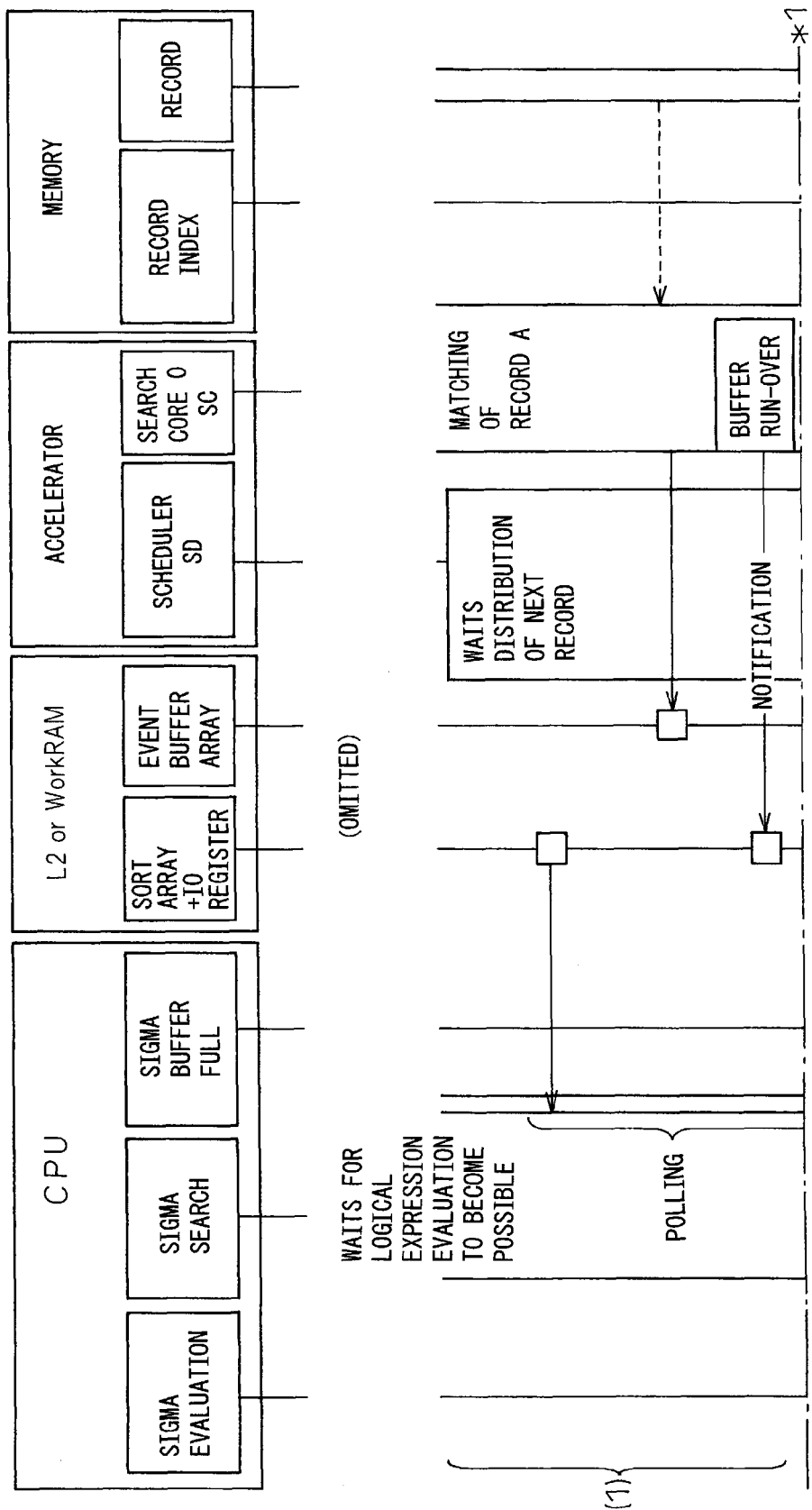
FIG. 22A, FIG. 22B and FIG. 22C are diagrams for explaining an example of operation in the event of an event buffer flush.
Figure 22B:
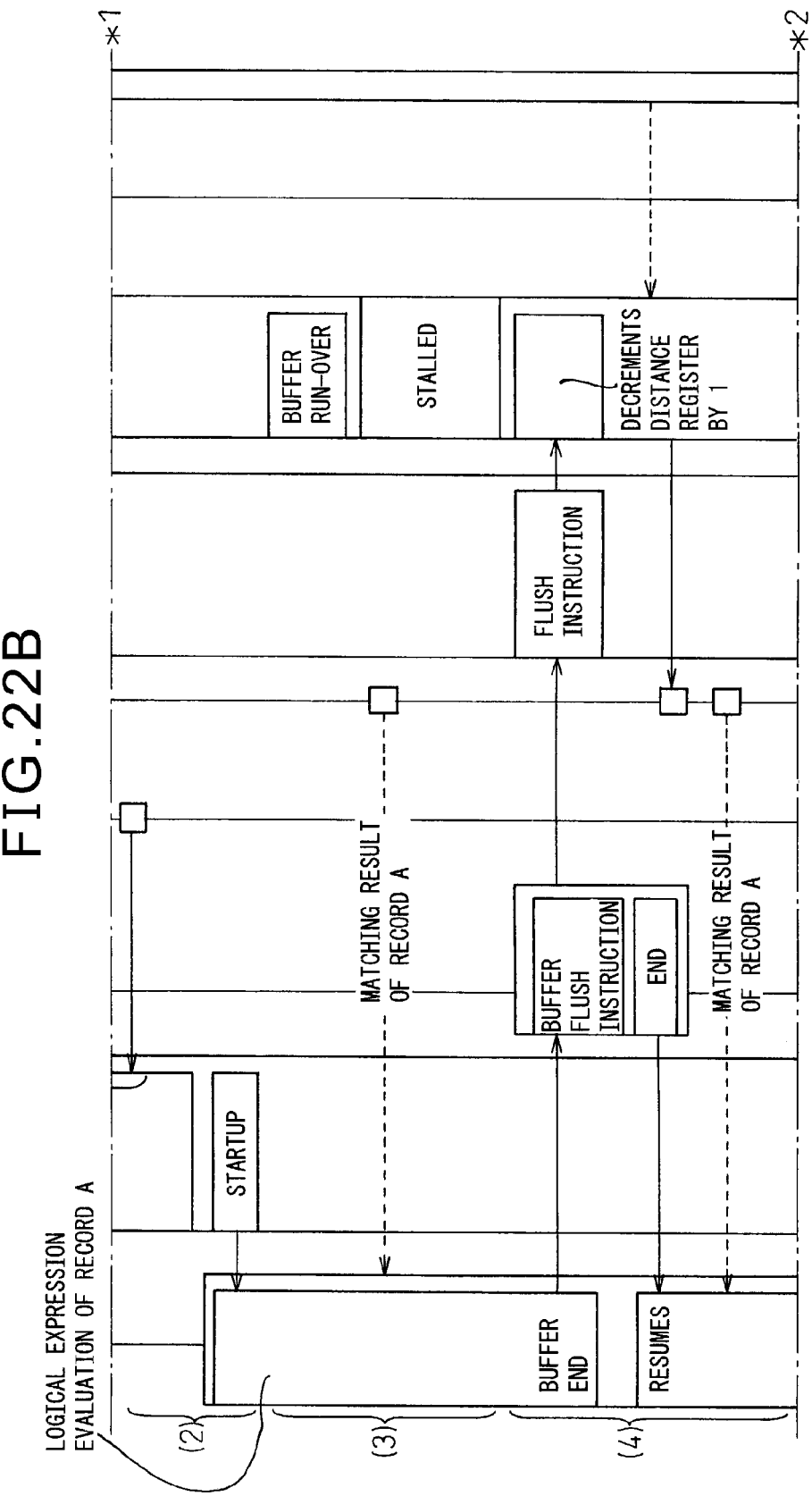
Figure 22C:
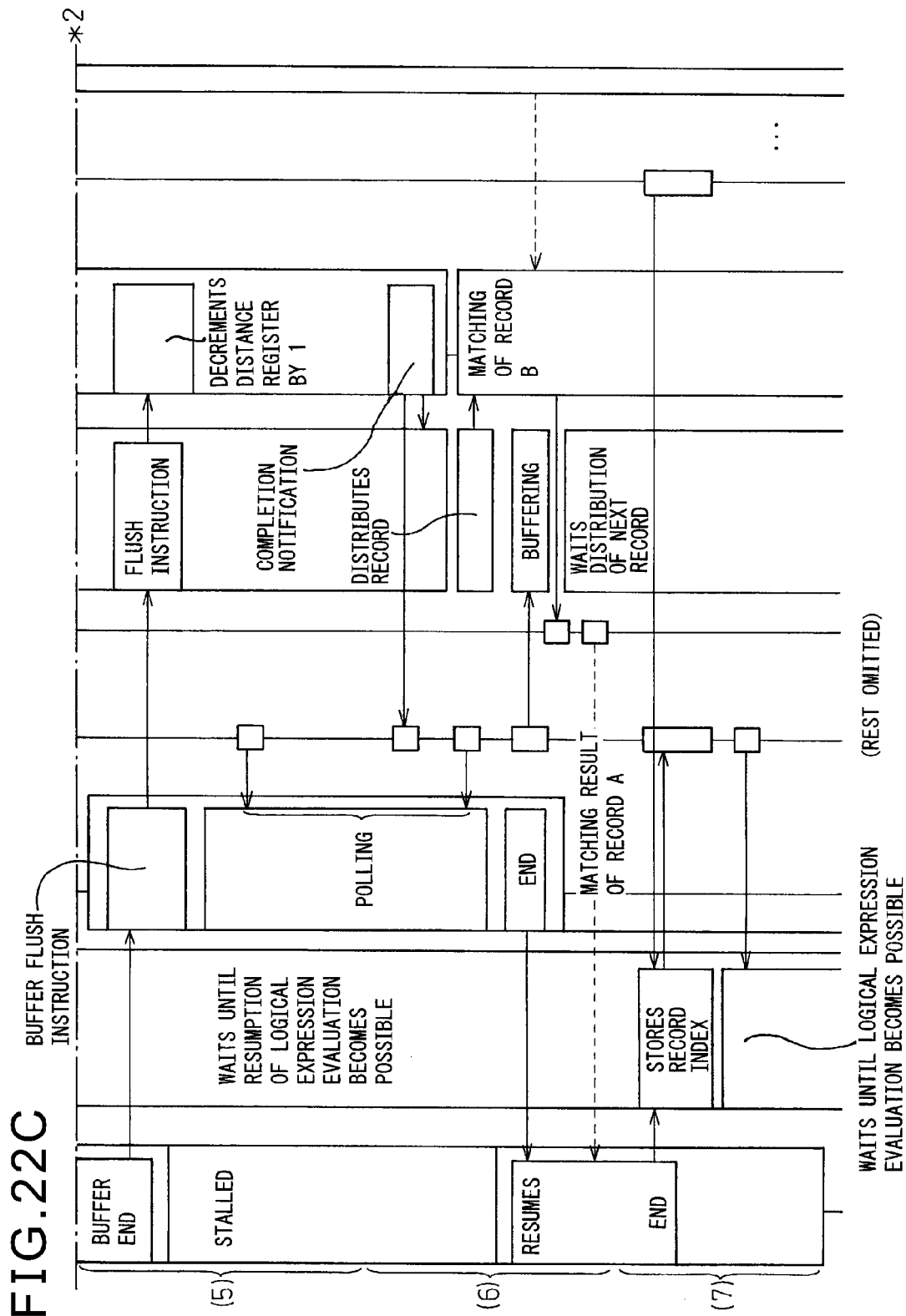

FIG. 22A, FIG. 22B and FIG. 22C are diagrams for explaining an example of operation in the event of a buffer flush, illustrating how the operation proceeds as the time elapses in the event of a buffer flush.

The example illustrated with reference to FIG. 18A, FIG. 18B and FIG. 18C is described by assuming the case where the event buffer size is infinite. However, in actuality, the event buffer size is finite, so that the event buffer is divided into two or more event buffers and used by switching from one buffer to another. An example of how it is used will be described below.

To simplify the explanation, FIG. 22A, FIG. 22B and FIG. 22C illustrate the configuration in which the number of search cores is one and the number of event buffers is two, and assume the case where the size of the matching result of a given record A becomes equal to or larger than the combined size of the two event buffers.

That is, the condition is that the number of search cores is one and the number of event buffers is two, and the situation is such that, since the matching of the record A runs over the end of one buffer, the evaluation may be immediately started; then, at the time of the first buffer flush, since the matching of the record A runs over the end of the second buffer, the process may be immediately terminated, while on the other hand, at the time of the second buffer flush, since the matching of the record A does not run over the end of a third buffer, the process waits.

Next, a description will be given of the operation of the operating entities in each of the time segments (1) to (6) illustrated at the left of FIG. 22A, FIG. 22B and FIG. 22C.

In time segment (1)

SIGMA Search: Polls the state flag of the record A and waits until the logical expression evaluation of the record A becomes possible. In this stage, the SIGMA Search continues polling.

SIGMA Evaluation: Does not exist.

SIGMA Buffer Full: Does not exist.

Scheduler: Checks the idle flag of the search core and waits until the distribution of the next record B becomes possible. In this stage, since the flag remains at "1" (busy state), the scheduler keeps waiting.

Search core: In the process of matching the record A. As in normal operation, a record character string is retrieved from memory, and the automaton is caused to transition. If a hit is detected, the hit information is written to the event buffer. While writing the hit information, if the write address reaches the end of the first event buffer, "1" is written to the state flag in the sort array (notification of an event buffer run-over is delivered). Then, the buffer distance register is incremented by "1".

In time segment (2)

SIGMA Search: Polls the state flag to find that the state flag is set to "1", so that the SIGMA Evaluation is called to perform the logical expression evaluation of the record A.

SIGMA Evaluation: Starts the logical expression evaluation of the record A passed to it, as in normal operation. At this time, the SIGMA Evaluation refers to the hit information stored in the event buffer.

SIGMA Buffer Full: Does not exist.

Scheduler: The operation is the same as in (1).

Search core: Writes the hit information to the second event buffer. Otherwise, the operation is the same as in (1).

In time segment (3)

SIGMA Search: Waits for the completion of the SIGMA Evaluation.

SIGMA Evaluation: Continues the logical expression evaluation started in (2).

SIGMA Buffer Full: Does not exist.

Scheduler: The operation is the same as in (2).

Search core: As in (1), while writing the hit information, the write address reaches the end of the first event buffer. Here, since the state flag is already set to "1", no notification is delivered to the outside. The buffer distance register is incremented by "1". At this time, the buffer distance register=2, which is not smaller than the number of event buffers (=2); since the first event buffer is consumed by the logical expression evaluation, but the evaluation is not completed yet, the search core stalls.

In time segment (4)

SIGMA Search: Waits for the completion of the SIGMA Evaluation, as in (3).

SIGMA Evaluation: Since the hit information in the event buffer being referred to during the logical expression evaluation indicates the end of the buffer (a bit pattern indicating the buffer end and a pointer to the next event buffer are prestored at the end of the event buffer), the SIGMA Evaluation calls the SIGMA Buffer Full. The pointer to the sort array entry of the record is passed as an argument. Before long, the SIGMA Buffer Full is completed, and the SIGMA Evaluation resumes the logical expression evaluation from the top of the next event buffer.

SIGMA Buffer Full: Identifies the search core number from the pointer to the sort array entry passed to it. Then, checks whether the corresponding flush completion flag is "0" or not. Since the flag is "0", "1" is written to the flag, and a copy of the buffer distance is acquired.

Further, the search core number is passed to the scheduler, instructing it to flush the event buffer allocated to the search core (in the example described here, it is not carried out to specify the search core number because there is only one search core, but generally it becomes preferable).

Next, it is determined whether or not the earlier acquired copy of the buffer distance (IO register) indicates 2 or more, or whether the state flag is set to "2" or not. Since the copy of the buffer distance indicates "2", the SIGMA Buffer Full function may be immediately terminated. The process then waits until the logical expression evaluation may be resumed.

Scheduler: Since the flush instruction and the search core number 0 are given, the scheduler instructs the corresponding search core 0 to flush the buffer.

Search core: Since the flush instruction is given while in a stalled condition, the search core decrements the buffer distance register by "1", and writes its contents to overwrite the copy of the buffer distance register maintained in the scheduler. Then, the flush completion flag is set to "0". Further, since the buffer distance is now "1", the matching operation is resumed.

In time segment (5)

SIGMA Search: Waits for the completion of the SIGMA Buffer Full, as in (4).

SIGMA Evaluation: Since the event buffer end is reached, as in (4), the SIGMA Evaluation calls the SIGMA Buffer Full once again. Thereafter, waits for the completion of the SIGMA Buffer Full.

SIGMA Buffer Full: The operation up to the instruction to the scheduler is the same as in (4). If, at this time, the flush completion flag is "1", the process waits (one flush back, but this is not the case here). Next, since the buffer distance held in advance is "1", the process polls the flush completion flag and the buffer distance, and waits until the flush completion flag=0 and until the buffer distance≧1 or the state flag=2.

Scheduler: Issues a flush instruction as in (4).

Search core: Flushes the buffer as in (4), and continues the matching operation.

In time segment (6)

SIGMA Search: Waits for the completion of the SIGMA Evaluation, as in (5).

SIGMA Evaluation: Waits for the completion of the SIGMA Buffer Full. Before long, the SIGMA Buffer Full is completed, and the logical expression evaluation is resumed from the top of the next event buffer.

SIGMA Buffer Full: Continues the polling started in (5). Before long, the state flag is set to "2" though the buffer distance is 1, so that the SIGMA Buffer Full is completed.

Scheduler: Waits the distribution of the next record, and upon receiving notification of the idle state from the search core 0, the scheduler distributes the next record B. The record information buffer is loaded once again, and the scheduler waits the distribution of the next record.

Search core: Completes the matching of the record, and notifies the sort array and the scheduler of the completion. Starts the matching of the next record B passed to it.

In time segment (7)
SIGMA Search: Waits for the completion of the SIGMA Evaluation, as in (6). Before long, the SIGMA Evaluation is completed, and the next record information is loaded into the freed sort array entry; then, the process waits until the logical expression evaluation becomes possible. At this time, since the matching of the record B is not completed yet, the process waits.
SIGMA Evaluation: Since the logical expression evaluation is completed, the SIGMA Evaluation is completed.
SIGMA Buffer Full: Does not exist.
Scheduler: Waits the distribution of the next record, as in (6).
Search core: Continues the matching of the record B started in (6).

The operation of the present embodiment is described above. Next, the search operation associated with each function will be described with reference to a flowchart.

Figure 23:
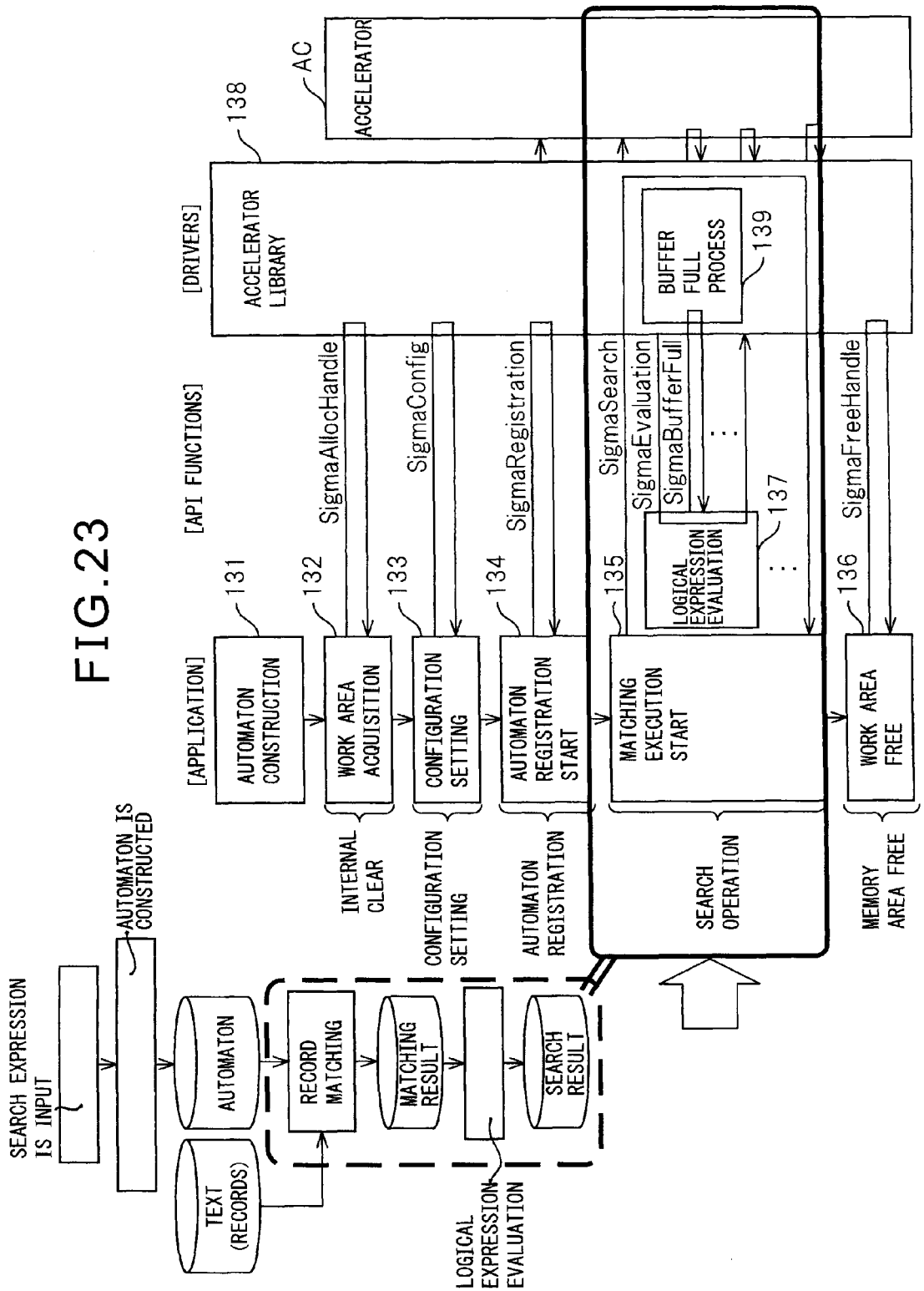
FIG. 23 is a diagram for explaining each API function and its call procedure in conjunction with its associated flowchart.

FIG. 23 is a diagram for explaining each API function and its call procedure in conjunction with its associated flowchart. In FIG. 23, the diagram on the left is a redrawn version of the search sequence illustrated in FIG. 5, and the diagram in the center is the same as the diagram of FIG. 13 used to explain each API function and its call procedure.

As illustrated in FIG. 23, the operation according to the present embodiment is the search operation corresponding to the record matching processing, matching result processing, logical expression evaluation processing, and search result processing in the search sequence. Here, in the search operation (the portion enclosed by thick lines in FIG. 23), the matching execution startup 135 corresponds to the SIGMA Search process illustrated in FIG. 24, the logical expression evaluation 137 corresponds to the SIGMA Evaluation process illustrated in FIG. 27, and the Buffer Full process 139 in the accelerator library 138 corresponds to the SIGMA Buffer Full process illustrated in FIG. 28.

The SIGMA Search process, the SIGMA Evaluation process, and the SIGMA Buffer Full process will be described below with reference to the respective flowcharts.

Figure 24:
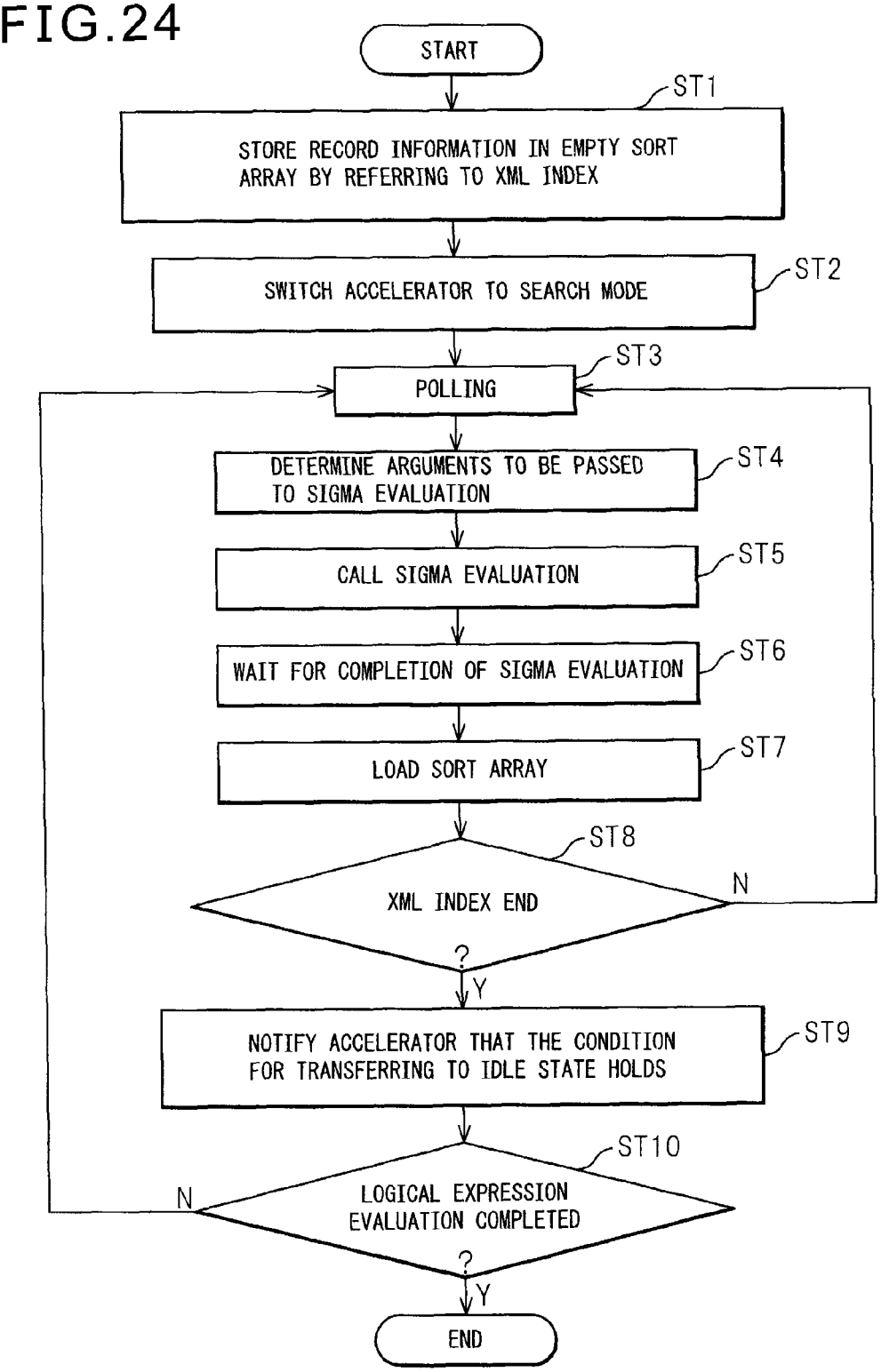
FIG. 24 is a flowchart illustrating one example of a SIGMA Search process.

FIG. 24 is a flowchart illustrating one example of the SIGMA Search process. The SIGMA Search process is the main routine (function) for starting the search operation.

When the SIGMA Search process is started, first in step ST1 the record information is stored in the sort array by referring to (scanning) the XML index, and then the process proceeds to step ST2.

In step ST2, the accelerator is switched to the search mode, and the process proceeds to step ST3 to perform polling. In this polling step, the state flag at the next evaluation record entry is polled.

When the logical expression evaluation becomes possible, the process proceeds to step ST4 to determine the arguments to be passed to the SIGMA Evaluation, after which the process proceeds to step ST5 to call the SIGMA Evaluation. A lower limit and/or an upper limit may be imposed on the number of arguments to be passed here.

Next, the process proceeds to step ST6 to wait for the completion of the SIGMA Evaluation and, when the SIGMA Evaluation is completed, in step ST7 the new record information is loaded into the sort array entry at which the previously passed record information is stored, and then the process proceeds to step ST8.

In step ST8, it is determined whether the XML index of the XML data reaches the index end. If it is determined in step ST8 that the XML index of the XML data does not yet reached the index end, the process returns to step ST3 to repeat the above process.

On the other hand, if it is determined in step ST8 that the XML index of the XML data reaches the index end, the process proceeds to step ST9 to notify the accelerator that the condition for transferring to the idle state holds, after which the process proceeds to step ST10.

In step ST10, it is determined whether the logical expression evaluation is completed or not and, if it is determined that the logical expression evaluation is completed, the function is terminated; otherwise, the process returns to the polling step ST3 to repeat the above process.

Figure 25:
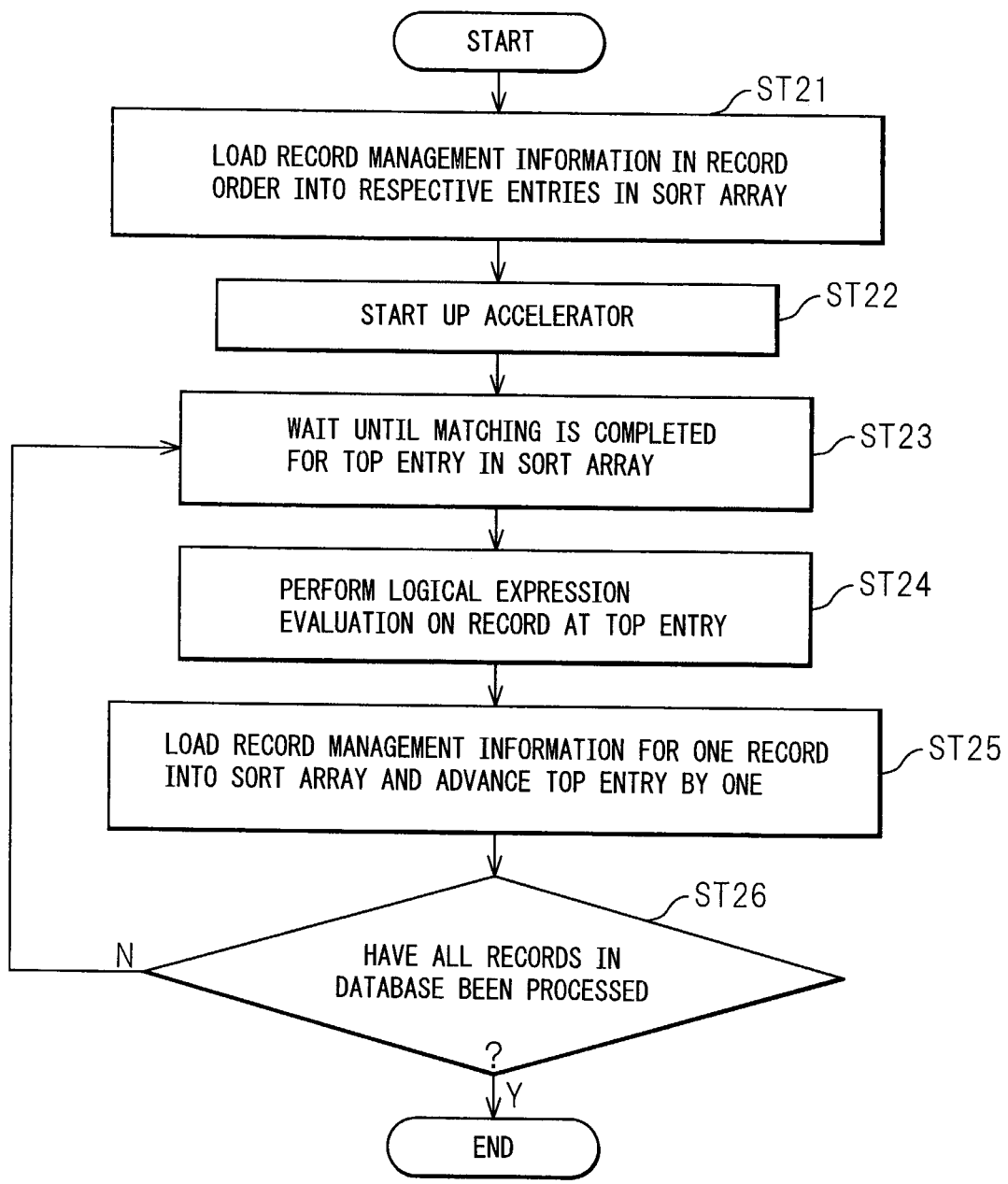
FIG. 25 is a flowchart illustrating the case where the process waits for the completion of SIGMA Evaluation in FIG. 24 on an entry-by-entry basis.
Figure 26:
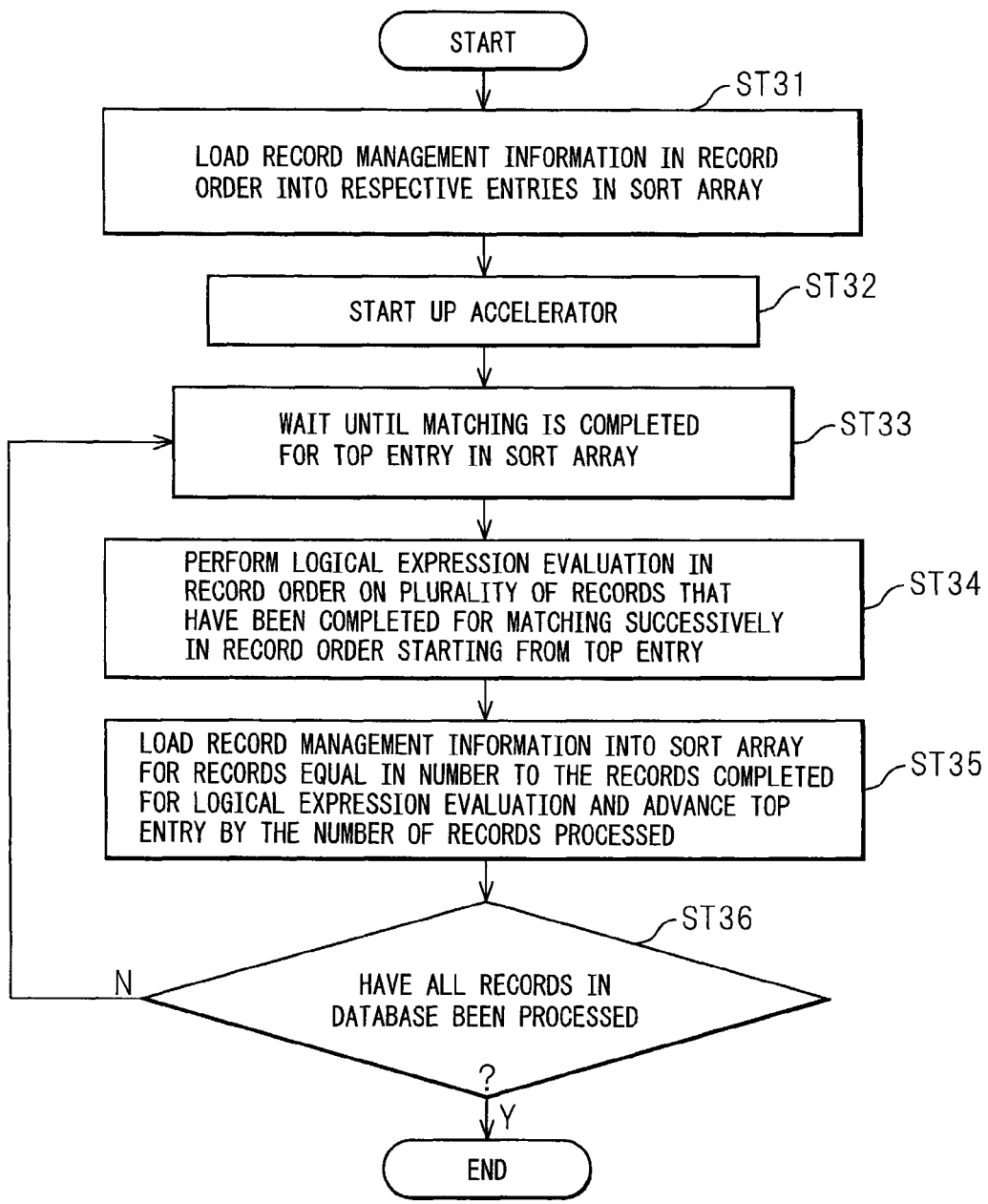
FIG. 26 is a flowchart illustrating the case where the process waits for the completion of SIGMA Evaluation in FIG. 24 for every predetermined plurality of entries.

FIG. 25 is a flowchart illustrating the case where the process waits for the completion of the SIGMA Evaluation in FIG. 24 on an entry-by-entry basis, and FIG. 26 is a flowchart illustrating the case where the process waits for the completion of the SIGMA Evaluation in FIG. 24 for every predetermined plurality of entries.

As illustrated in FIG. 25, in the case where the process waits for the completion of the SIGMA Evaluation in FIG. 24 on an entry-by-entry basis, first in step ST21 the record management information is loaded in record order (in order of record sequence number) into the respective entries in the sort array, and then the process proceeds to ST22 to start up the accelerator.

The process further proceeds to step ST23 to wait until the matching is completed for the top entry in the sort array, after which the process proceeds to step ST24. In step ST24, the logical expression evaluation is performed on the record at the top entry, and the process proceeds to ST25.

In step ST25, the record management information for one record is loaded into the sort array, and the top entry is advanced by one.

Then, the process proceeds to step ST26 to determine whether all the records in the database are processed; if there is any record remaining to be processed, the process returns to step ST23 to repeat the above process; if it is determined that all the records in the database are processed, the process is terminated.

As illustrated in FIG. 26, in the case where the process waits for the completion of the SIGMA Evaluation in FIG. 24 for every predetermined plurality of entries, first in step ST31 the record management information is loaded in record order into the respective entries in the sort array, and then the process proceeds to ST32 to start up the accelerator.

The process further proceeds to step ST33 to wait until the matching is completed for the top entry in the sort array, after which the process proceeds to step ST34. In step ST34, the logical expression evaluation is performed in record order on the plurality of records that are completed for matching successively in record order starting from the top entry, and the process proceeds to ST35.

In step ST35, the record management information for records equal in number to the records completed for logical expression evaluation is loaded into the sort array, and the top entry is advanced by the number of records processed.

Then, the process proceeds to step ST36 to determine whether all the records in the database are processed; if there is any record remaining to be processed, the process returns to step ST33 to repeat the above process; if it is determined that all the records in the database are processed, the process is terminated.

Figure 27:
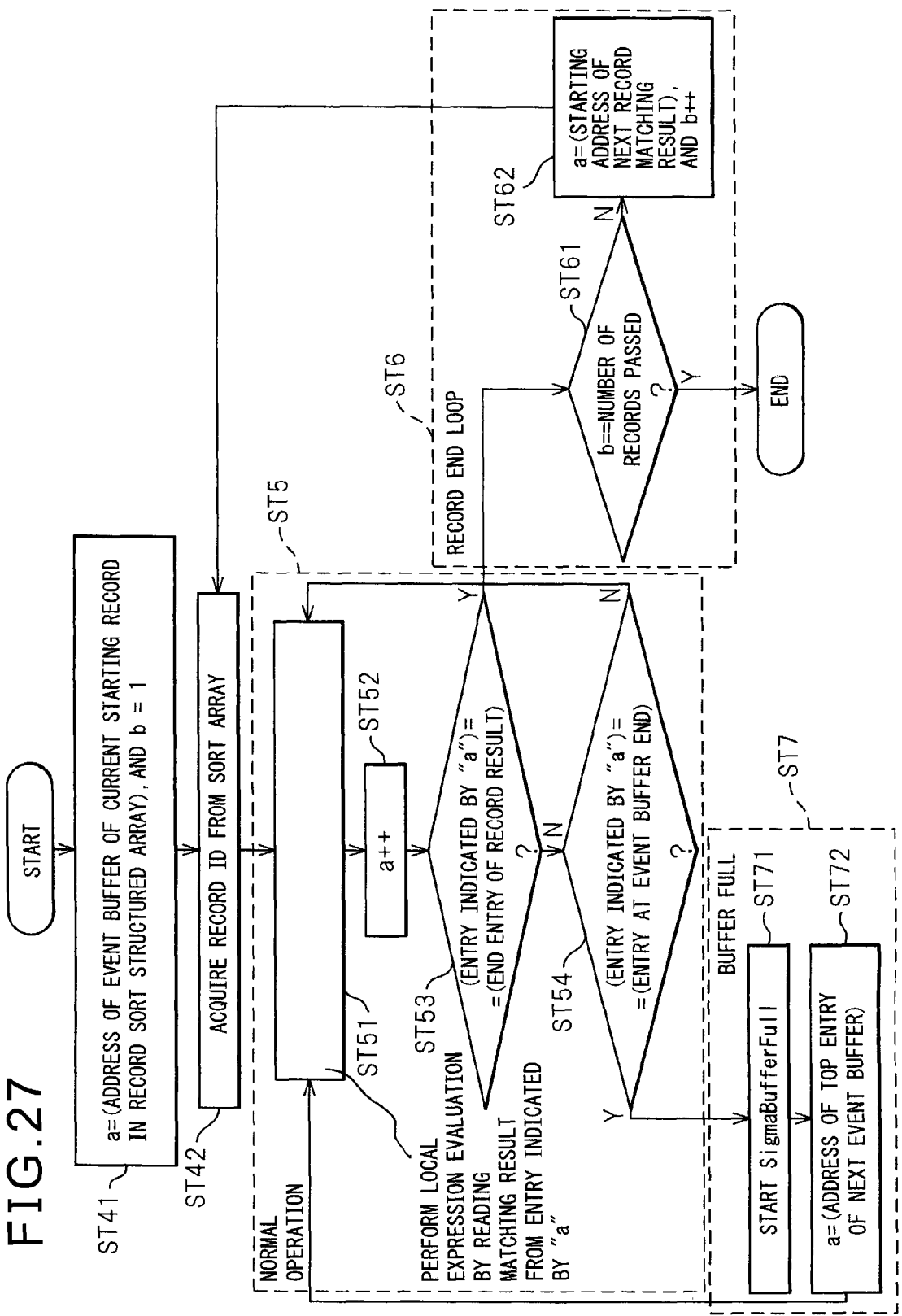
FIG. 27 is a flowchart illustrating one example of a SIGMA Evaluation process.

FIG. 27 is a flowchart illustrating one example of the SIGMA Evaluation process. Here, the SIGMA Evaluation is a function for performing the logical expression evaluation, and is called when it is determined by the SIGMA Search that the logical expression evaluation may be performed.

As illustrated in FIG. 27, when the sort array entry address of the starting record requested and the number of records counted from that record are passed to the function, first in step ST41 "a" is set to indicate the address of the event buffer of the current record in the record sort structured array, and "b" is set equal to 1, after which the process proceeds to step ST42. In step ST42, the record ID is acquired from the sort array, and the process proceeds to step ST5 to initiate the normal operation (normal operation loop). That is, the local expression evaluation is started by taking the starting record as the current record, and the evaluation is performed by reading each entry from the event buffer.

Step ST5 comprises steps ST51 to ST54, and first in step ST51, the local expression evaluation is performed by reading the matching result from the entry indicated by "a".

Next, the process proceeds to step ST52 where "a" is set to "a++", and the process further proceeds to ST53 where it is determined whether the relation (entry indicated by "a")==(end entry of record result) holds or not.

If it is determined in step ST53 that the relation (entry indicated by "a")==(end entry of record result) holds, the process proceeds to step ST61 in the record end loop (step ST6); on the other hand, if it is determined that the relation (entry indicated by "a")==(end entry of record result) does not hold, the process proceeds to step ST54.

In step ST61, it is determined whether the relation "b"==(number of records passed) holds or not; if it is determined that the relation "b"==(number of records passed) does not hold, then in step ST62 "a" is set to indicate the starting address of the next record matching result, and "b" is set to "b++", after which the process returns to step ST42 to repeat the above process. If it is determined in step ST61 that the relation "b"==(number of records passed) holds, the process is terminated.

That is, if the current record is completed, the next record is set and the process returns to the normal operation, but if the current record is not completed, the process is terminated.

In step ST54, it is determined whether the relation (entry indicated by "a")==(entry at event buffer end) holds or not; if it is determined that the relation (entry indicated by "a")==(entry at event buffer end) holds, the process proceeds to step ST71 in the Buffer Full operation, and the SIGMA Buffer Full is started, after which the process proceeds to step ST72.

Then, in step ST72, "a" is set to indicate the address of the top entry of the next event buffer, and the process returns to step ST51; if it is determined in step ST54 that the relation "*a"==(entry at event buffer end) does not hold, the process also returns to step ST51 to repeat the above process.

That is, when the event buffer end is reached, the SIGMA Buffer Full is called, and the process waits until the process is returned, after which the process returns to the normal operation.

Figure 28:
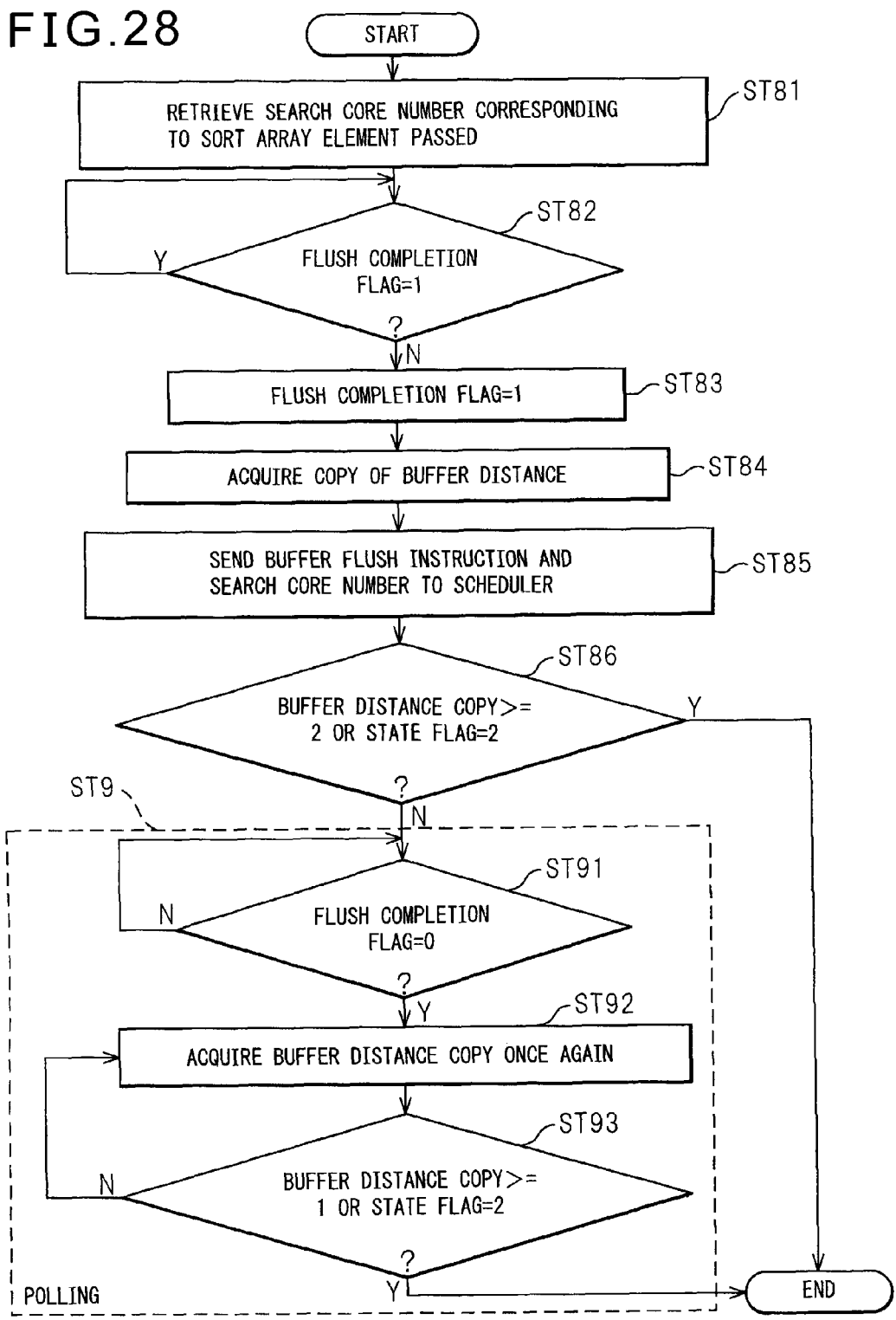
FIG. 28 is a flowchart illustrating one example of a SIGMA Buffer Full process.

FIG. 28 is a flowchart illustrating one example of the SIGMA Buffer Full process. Here, the SIGMA Buffer Full is a function responsible for event buffer switching and directs the flushing of the event buffer of the corresponding search core; this function is called when the event buffer end is reached in the SIGMA Evaluation.

As illustrated in FIG. 28, first in step ST81 the search core number corresponding to the sort array element passed to the function is retrieved, and the process proceeds to step ST82. More specifically, the address of the sort array entry of the event buffer to be flushed is passed as an argument, and the search core number is retrieved by referring to the sort array using that address.

In step ST82, it is determined whether the flush completion flag is "1" or not, and the process is continued until it is determined that the flush completion flag is not "1"; when it is determined that the flush completion flag is not "1", the process proceeds to step ST83.

In step ST83, the flush completion flag is set to "1", and the process proceeds to step ST84 to acquire a copy of the buffer distance. That is, the process waits until the previous flush instruction for that search core becomes ready, and if the flush instruction is possible, a copy of the buffer distance is acquired from the IO register maintained in the scheduler.

The process further proceeds to step ST85 to send the buffer flush instruction and the search core number to the scheduler, after which the process proceeds to step ST86.

In step ST86, it is determined whether the buffer distance copy$\geq 2$ or whether the state flag=2, and if neither of these relations holds, the process proceeds to the polling step ST9; on the other hand, if it is determined that the buffer distance copy$\geq 2$ or the state flag=2, the process is terminated.

That is, by referring to the earlier acquired buffer distance copy and the state flag in the sort array, it is determined whether the process may be terminated or not. When the process is terminated, the logical expression evaluation is resumed.

In step ST9 which comprises steps ST91 to ST93, the flush completion flag is polled, and the state flag and the buffer distance copy are polled to determine whether the process may be terminated or not.

That is, in step ST91, it is determined whether the flush completion flag=0, and the process is continued until it is determined that the flush completion flag=0; when it is determined that the flush completion flag=0, the process proceeds to step ST92 to acquire the buffer distance copy once again, after which the process proceeds to step ST93.

In step ST93, it is determined whether the buffer distance copy$\geq 1$ or whether the state flag=2, and if neither of these relations holds, the process returns to step ST92 to repeat the above process; on the other hand, if it is determined that the buffer distance copy$\geq 1$ or the state flag=2, the process is terminated.

While the above embodiments are described primarily for the search device and search method that performs automaton processing, it will be appreciated that the embodiments may be applied generally to a parallel processing system whose input data and intermediate data include characteristic states and more specifically to a search device and search method that processes data having such characteristic states.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention.

Although the embodiments of the present invention have been described in detail, it should be understood that the various changes, substitutions, and alterations could be made hereto without departing from the spirit and scope of the invention.

What is claimed is:

1. A search device comprising:
   an accelerator device including a plurality of computer processor search cores and a scheduler, said scheduler being configured to distribute target text to said computer processor search cores in units of records that are ordered by record sequence number, and said computer processor search cores being configured to perform automaton record matching on said distributed records in a parallel fashion;

a CPU configured to construct an automaton for execution on the computer processor search cores of the accelerator device in accordance with a search expression input thereto, said CPU being configured to perform logical expression evaluations in order of said record sequence number on matching results obtained on a record-by-record basis from the computer processor search cores of the accelerator device;

an event buffer configured to store a result of the automaton record matching by the accelerator device; and a record sort array configured to store a pointer for a matching result in the event buffer in the order of said record sequence number, to achieve parallel processing by eliminating need for maintaining the matching results records in order of matching.

2. The search device according to claim 1, wherein neither said records constituting the target text nor the matching results of said records include regularity in data size.

3. The search device according to claim 1, further comprising a local memory for storing data to be shared between said CPU and said computer processor search cores, wherein
said shared data includes the event buffer and the record sort array and management information for managing said plurality of records; and
said record sequence numbers are stored as said management information in said local memory.

4. The search device according to claim 3, wherein two or more memory areas in said local memory are allocated to each of said computer processor search cores.

5. The search device according to claim 4, wherein each of said memory areas allocated to each of said computer processor search cores carries at an endpoint thereof a pointer pointing to the beginning of the next memory area.

6. The search device according to claim 3, wherein said management information retains order of text groups to be matched by an array or list structure.

7. The search device according to claim 3, wherein said scheduler reads said management information and distributes said management data in order of said record sequence number to each idle one of said computer processor search cores, instructing said each idle computer processor search core to perform a matching operation, and said computer processor search cores complete said matching operations in a random order.

8. The search device according to claim 7, wherein said scheduler includes a register for holding information based on which to determine whether any one of said computer processor search cores is in an idle state.

9. The search device according to claim 8, wherein said scheduler includes a buffer for temporarily storing said management information.

10. The search device according to claim 1, wherein said target text is a structured document, and each of said computer processor search cores searches for a prescribed character string from data of said structured document.

11. The search device according to claim 10, wherein said structured document is an XML document.

12. A search method by a search device, comprising:
configuring in a search device a CPU and an accelerator device including a plurality of computer processor search cores and a scheduler;
configuring the search device to execute:
constructing by the CPU an automaton for execution on the computer processor searching cores of the accelerator device in accordance with a search expression input thereto;
distributing by the scheduler of the accelerator device target text to said computer processor search cores of the accelerator device in units of records ordered by record sequence number;
performing by the computer processor search cores of the accelerator device automaton record matching on said distributed records in a parallel fashion;
performing by the CPU logical expression evaluations in order of said record sequence number on matching results obtained on a record-by-record basis from the computer processor search cores of the accelerator device;
storing a result of the automaton record matching from the accelerator device in an event buffer; and
storing a pointer for a matching result in the event buffer in the order of said record sequence number in a record sort array, to achieve parallel processing by eliminating need for maintaining the matching result records in order of matching.

13. The search method according to claim 12, wherein neither said records constituting the target text nor the matching results of said records include regularity in data size.

14. The search method according to claim 12, wherein said scheduler reads management information for managing a plurality of records in data shared between said CPU and said computer processor search cores, and distributes said management data in order of said record sequence number to each idle one of said computer processor search cores, instructing said each idle computer processor search core to perform a matching operation, and said computer processor search cores complete said matching operations in a random order.

15. The search method according to claim 14, wherein said scheduler includes a register for holding information based on which to determine whether any one of said computer processor search cores is in an idle state.

16. The search method according to claim 15, wherein said scheduler includes a buffer for temporarily storing said management information.

17. The search method according to claim 12, wherein said target text is a structured document, and each of said computer processor search cores searches for a prescribed character string from data of said structured document.

18. The search method according to claim 17, wherein said structured document is an XML document.

19. A computer readable storage medium storing instructions to control a computer by:
controlling a CPU and an accelerator device including a plurality of computer processor search cores and a scheduler, to execute:
constructing by the CPU an automaton for execution on the computer processor searching cores of the accelerator device in accordance with a search expression input thereto;
distributing by the scheduler of the accelerator device target text to said computer processor search cores of the accelerator device in units of records ordered by record sequence number;
performing by the computer processor search cores of the accelerator device automaton record matching on said distributed records in a parallel fashion; and
performing by the CPU logical expression evaluations in order of said record sequence number on matching results obtained on a record-by-record basis from the computer processor search cores of the accelerator device
storing a result of the automaton record matching from the accelerator device in an event buffer; and storing a pointer for a matching result in the event buffer in the order of said record sequence number in a record sort array, to achieve parallel processing by eliminating need for maintaining the matching result records in order of matching.

* * * * *

UNITED STATES PATENT AND TRADEMARK OFFICE
CERTIFICATE OF CORRECTION

PATENT NO.         : 8,423,499 B2  
APPLICATION NO.    : 12/974877  
DATED              : April 16, 2013  
INVENTOR(S)        : Yi Ge et al.

Page 1 of 1

It is certified that error appears in the above-identified patent and that said Letters Patent is hereby corrected as shown below:

In the Claims

Column 23, Line 15 (Approx.), In Claim 1, delete "results" and insert -- result --, therefor.
Column 24, Line 65, In Claim 19, delete "device" and insert -- device; --, therefor.

Signed and Sealed this
Sixteenth Day of July, 2013

Teresa Stanek Rea
*Acting Director of the United States Patent and Trademark Office*